(12) United States Patent
Northrup et al.

(10) Patent No.: US 10,234,240 B2
(45) Date of Patent: Mar. 19, 2019

(54) SYSTEM AND METHOD FOR MARKSMANSHIP TRAINING

(71) Applicant: Shooting Simulator, LLC, Yantis, TX (US)

(72) Inventors: James L. Northrup, Dallas, TX (US); Robert P. Northrup, Dallas, TX (US); Peter F. Blakeley, Yantis, TX (US)

(73) Assignee: Shooting Simulator, LLC, Dallas, TX (US)

( * ) Notice: Subject to any disclaimer, the term of this patent is extended or adjusted under 35 U.S.C. 154(b) by 291 days.

(21) Appl. No.: 14/969,302

(22) Filed: Dec. 15, 2015

(65) Prior Publication Data

US 2016/0169627 A1 Jun. 16, 2016

Related U.S. Application Data

(63) Continuation-in-part of application No. 14/686,398, filed on Apr. 14, 2015, now Pat. No. 10,030,937.
(Continued)

(51) Int. Cl.
*F41G 3/26* (2006.01)
*F41A 33/00* (2006.01)
*G06F 3/01* (2006.01)

(52) U.S. Cl.
CPC .......... *F41G 3/2633* (2013.01); *F41A 33/00* (2013.01); *F41G 3/26* (2013.01); *F41G 3/2655* (2013.01); *G06F 3/011* (2013.01)

(58) Field of Classification Search
CPC .......... F41A 33/00; F41A 33/02; F41A 33/04; F41A 33/06; F41A 33/08; F41G 3/26;
(Continued)

(56) References Cited

U.S. PATENT DOCUMENTS 2,023,497 A 12/1935 Trammell
3,748,751 A 7/1973 Breglia et al.
(Continued)

FOREIGN PATENT DOCUMENTS

CA 2745701 A1 6/2010
EP 1218687 7/2003
(Continued)

OTHER PUBLICATIONS

Control VR, "The Future of Virtual Reality, Animation & more", video, (undated), https://www.youtube.com/watch?v=UCIUkL24oMc.
(Continued)

*Primary Examiner* — Timothy A Musselman
(74) *Attorney, Agent, or Firm* — Schultz & Associates, P.C.

(57) ABSTRACT

A system and method for simulating lead of a target includes a network, a simulation administrator and a user device connected to the network, a database connected to the simulation administrator, and a set of position trackers positioned at a simulator site. The user device includes a virtual reality unit and a computer connected to the set of virtual reality unit and to the network. A generated target is simulated. The target and the user are tracked to generate a phantom target and a phantom halo. The phantom target and the phantom halo are displayed on the virtual reality unit at a lead distance and a drop distance from the target as viewed through the virtual reality unit.

20 Claims, 29 Drawing Sheets

Related U.S. Application Data which is a continuation-in-part of application No. 14/149,418, filed on Jan. 7, 2014, now Pat. No. 9,261,332, which is a continuation-in-part of application No. 13/890,997, filed on May 9, 2013, now Pat. No. 9,267,762.

(58) Field of Classification Search
CPC .... F41G 3/2616; F41G 3/2644; F41G 3/2633; F41G 3/2655; G06F 3/011
See application file for complete search history.

(56) References Cited

U.S. PATENT DOCUMENTS

| | | |
|---|---|---|
| 3,811,204 A | 5/1974 | Marshall et al. |
| 3,904,204 A | 9/1975 | Yokol |
| 3,945,133 A | 3/1976 | Mohan et al. |
| 3,995,376 A | 12/1976 | Kimble et al. |
| 4,079,525 A | 3/1978 | Linton et al. |
| 4,102,059 A | 7/1978 | Kimble et al. |
| 4,223,454 A | 9/1980 | Mohon et al. |
| 4,317,651 A | 3/1982 | Marshall et al. |
| 4,457,715 A | 7/1984 | Knight et al. |
| 4,583,950 A | 4/1986 | Schroeder |
| 4,824,374 A | 4/1989 | Hendry et al. |
| 5,194,006 A | 3/1993 | Zaenglien, Jr. |
| 5,591,032 A | 1/1997 | Powell et al. |
| 5,641,288 A | 6/1997 | Zaenglein, Jr. |
| 5,991,043 A | 11/1999 | Andersson et al. |
| 6,322,365 B1 | 11/2001 | Shechter et al. |
| 6,780,014 B1 | 8/2004 | Hull et al. |
| 6,942,486 B2 | 9/2005 | Lvovskiy |
| RE38,877 E | 11/2005 | Trabut |
| 6,997,716 B2 | 2/2006 | Skala et al. |
| 7,188,444 B2 | 3/2007 | Danner et al. |
| 7,329,127 B2 | 2/2008 | Kendir et al. |
| 7,810,273 B2 | 10/2010 | Koch et al. |
| 8,016,594 B2 | 9/2011 | Ferris et al. |
| 8,267,691 B1 | 9/2012 | Ferris et al. |
| 8,646,201 B2 | 2/2014 | Hughes et al. |
| 8,734,156 B2 | 5/2014 | Uhr |
| 8,827,706 B2 | 9/2014 | Hogan, Jr. |
| 8,926,444 B2 | 1/2015 | Kato et al. |
| 8,944,940 B2 | 2/2015 | Mettler |
| 9,200,870 B1 | 12/2015 | Theel |
| 2002/0012898 A1 | 1/2002 | Shechter et al. |
| 2003/0109298 A1 | 6/2003 | Oishi et al. |
| 2004/0031184 A1 | 2/2004 | Hope |
| 2006/0158910 A1 | 7/2006 | Hunt et al. |
| 2007/0032318 A1 | 2/2007 | Nishimura et al. |
| 2007/0254266 A1 | 11/2007 | Galanis et al. |
| 2008/0108021 A1 | 5/2008 | Slayton et al. |
| 2009/0155747 A1 | 6/2009 | Cornett et al. |
| 2009/0325699 A1 | 12/2009 | Delgiannidis |
| 2010/0141225 A1 | 6/2010 | Isham et al. |
| 2010/0173686 A1 | 7/2010 | Grant et al. |
| 2010/0201620 A1 | 8/2010 | Sargent |
| 2011/0111374 A1 | 5/2011 | Charles et al. |
| 2011/0207089 A1 | 8/2011 | Lagettie et al. |
| 2011/0244975 A1 | 10/2011 | Farmer et al. |
| 2011/0283586 A1 | 11/2011 | Scallie et al. |
| 2012/0015332 A1 | 1/2012 | Stutz |
| 2012/0183931 A1 | 7/2012 | Galanis et al. |
| 2012/0270186 A1 | 10/2012 | Singh |
| 2012/0297654 A1 | 11/2012 | Williams et al. |
| 2013/0040268 A1 | 2/2013 | Van der Walt et al. |
| 2013/0130205 A1 | 5/2013 | Matthews et al. |
| 2013/0344461 A1 | 12/2013 | Tello |
| 2014/0038136 A1 | 2/2014 | Hamilton et al. |
| 2014/0206481 A1 | 7/2014 | Zuger |
| 2014/0295380 A1 | 10/2014 | Amis et al. |
| 2015/0010887 A1 | 1/2015 | Foege |

FOREIGN PATENT DOCUMENTS

| | | |
|---|---|---|
| EP | 944809 | 10/2003 |
| TW | 201241396 | 10/2012 |
| WO | 2010065124 | 6/2010 |

OTHER PUBLICATIONS

Davies, Alex, "Hands-on With the HTC Vive", Tom's Hardware, website, Mar. 30, 2015, http://www.tomshardware.com/reviews/htc-vive-virtualy-reality-hands-on,4102.html.
EOTech, Inc., "EOTech Weapon Accessories", website, (undated), http://www.eotechinc.com.
EOTech, Inc., "Pro Staffer: Craig Foster", website, (undated), http://www.eotechinc.com/pro-staffer-craig-foster.
Freeze HD, "Top 5 Virtual Reality gadgets of the future", video, (undated), https://www.youtube.com/watch?v=9ypIHQhaVXU.
"Image Stabilization", Wikipedia, website, (undated), http://en.wikipedia.org/wiki/Image_stabilization#Digital_image_stabilization.
Tracking Point, Inc., "How It Works", website, (undated), http://tracking-point.com/how-it-works.
"US Patent Issued to Vitra Systems on Sep. 18 for Threat Fire Simulation and Training System" (Arizona Inventors), HighBeam Research, website, Sep. 19, 2012, http://www.highbeam.com/doc/1P3-2764873051.html.
Van Camp, Jeffrey, "Hands on: HTC Vive VR Headset", DigitalTrends, website, Mar. 4, 2015, http://www.digitaltrends.com/vr-headset-reviews/htc-vive-hands-on/2/.
Vanguard, "Smart gun: A test bed for the army's next-generation rifle", website, May 6, 2015, http://www.vanguardcanada.com/2015/05/06/smart-gun-a-test-bed-for-the-armys-next-generation-rifle/.
Virtra, Inc., "Firearms Training Simulators", website, (undated), http://www.virtra.com/.
Virtra, Inc., "Patent Information", website, (undated), http://www.virtra.com/patent-related/.
Virtra, "VirTra on CNN Anderson Cooper 360", video, (undated), https://vimeo.com/117621064.
Wawro, Alex, "TrackingPoint's sensor-packed smart gun redefines the term 'point and shoot'", TechHive, website, Jul. 31, 2013, http://www.techhive.com/article/2045080/trackingpoints-sensor-packed-smart-gun-redefines-the-term-point-and-shoot.html.
Zant, Cal, "How Do Rangefinders Work?", Precision Rifle Blog, website, Oct. 29, 2013, http://precisionrifleblog.com/2013/10/29/how-do-rangefinders-work/.
Zant, Cal, "Rangefinder Binoculars Reviews & Field Tests: Overall Results Summary", Precision Rifle Blog, website, Dec. 3, 2013, http://precisionrifleblog.com/2013/12/03/rangefinder-binoculars-reviews-field-tests-overall-results-summary/.
accurateshooter.com, "New Wind-Reading LIDAR LaserScope", website, (undated), www.accurateshooter.com/optics/new-wind-reading-lidar-laserscope/.
accurateshooter.com, "SCATT Aim-Tracking IR Training System", website, (undated), http://www.accurateshooter.com/optics/scatt-aim-tracking-ir-training-system/.
Avenger Advantage, LLC, "Delta Six: The Ultimate First Person Shooter Controller", website, (undated), http://www.thedeltasix.com/.
Brewster, Signe, "Hands on with the HTC Valve Vive virtual reality headset", Gigaom, website, May 7, 2015, https://gigaom.com/2015/03/07/hands-on-with-the-htc-valve-vive-virtual-reality-headset/.
Bushnell, "Yardage Pro Riflescope", website, (undated), http://www.bushnell.com/all-products/laser-rangefinders/yardage-pro-riflescope.
Fove, "The World's First Eye Tracking Virtual Reality Headset", May 19, 2015, http://kickstarter.com/projects/fove/fove-the-worlds-first-eye-tracking-virtual-reality/?utm_source=road-to-vr&utm_medium=display&utm_content=banner-ad&utm_campaign=launch-announcement-preorder.
"10 Forthcoming Augmented Reality & Smart Glasses You Can Buy.pdf", http://www.hongkiat.com/blog/augmented-reality-smart-glasses/, accessed on Apr. 26, 2017.

(56) References Cited

OTHER PUBLICATIONS

"Augmented Reality Using Unity3D, Vuforia and Arduino", http://www.instructables.com/id/Augmented-Reality-using-Unity3D-Vuforia-and-Arduin/, accessed on Apr. 26, 2017.
"Bushnell 50 Caliber to 12-Gauge Expandable Arbor", https://www.amazon.com/Bushnell-Caliber-12-Gauge-Expandable-Arbor/dp/B0002LWWBM/ref=pd_sim_200_1?_encoding=UTF8&pd_rd_i=B0002LWWBM&pd_rd_r=B91VNN5NMQF3PGM9ZG2T&pd_rd_w=0SqtJ&pd_rd_wg=0syk9&psc=1&refRID=B91VNN5NMQF3PGM9ZG2T, accessed on Apr. 26, 2017.
"Custom Single Zone Force Sensing Resistors", http://www.sensitronics.com/products-fsr.php, accessed on Apr. 26, 2017.
"Force Sensing Linear Potentiometers", http://www.sensitronics.com/products-force-sensing-linear-potentiometers.php, accessed on Apr. 26, 2017.
"Go Beyond Your VR Controllers", https://www.vive.com/us/vive-tracker/, accessed on Apr. 26, 2017.
"Intro to Unity3D and AR (Augmented Reality)", http://www.rivellomultimediaconsulting.com/unity3d-augmented-reality/, accessed on Apr. 26, 2017.
"Laser Training Cartridges Gen2", http://www.g-sight.com/training-lasers/, accessed on Apr. 26, 2017.
"Magic Leaps Augmented Reality FPS Demo Is Unbelievable", http://www.cinemablend.com/games/Magic-Leap-Augmented-Reality-FPS-Demo-Unbelievable-70816.html, accessed on Apr. 26, 2017.
"MeshLab", http://www.meshlab.net/, accessed on Apr. 26, 2017.
"Quick Release Pipe Clamp", https://www.amazon.com/Grifiti-Threaded-Microphone-Diameter-Motorcycles/dp/B00E5M39AW/ref=pd_rhf_dp_s_cp_5?_encoding=UTF8&pd_rd_i=B00E5M39AW&pd_rd_r=QQB0M0FYBZ1QBQ65V7WG&pd_rd_w=iE5RV&pd_rd_wg=ZFRKc&psc=1&refRID=QQB0M0FYBZ1QBQ65V7WG, accessed on Apr. 26, 2017.
"Shotgun pattern measurement & analysis", http://www.shotgun-insight.com/intro.html, accessed on Apr. 26, 2017.
"Super photo clamp", https://www.manfrotto.us/super-photo-clamp-without-stud-aluminium, accessed on Apr. 26, 2017.
"Tipton Snap Cap Pistol ACP 5 Pack", http://www.opticsplanet.com/tipton-snap-cap-pistol-5-pack.html, accessed on Apr. 26, 2017.
"Vive Tracker Includes USB Add-on to Connect the Additional Accessory", https://uploadvr.com/vive-tracker-includes-usb-add-connect-wireless-accessories/, accessed on Apr. 26, 2017.
"Voice-activated control for your PC games and apps", https://voiceattack.com/, accessed on Apr. 26, 2017.
Ansar, "Registration for augmented reality" Abstract, http://repository.upenn.edu/dissertations/AAI3031635/, accessed on Apr. 26, 2017.
ARC4 True Augmented Reality, https://www.ara.com/sites/default/files/docs/ARC4_Brochure_Commercial.pdf, accessed on Apr. 26, 2017.

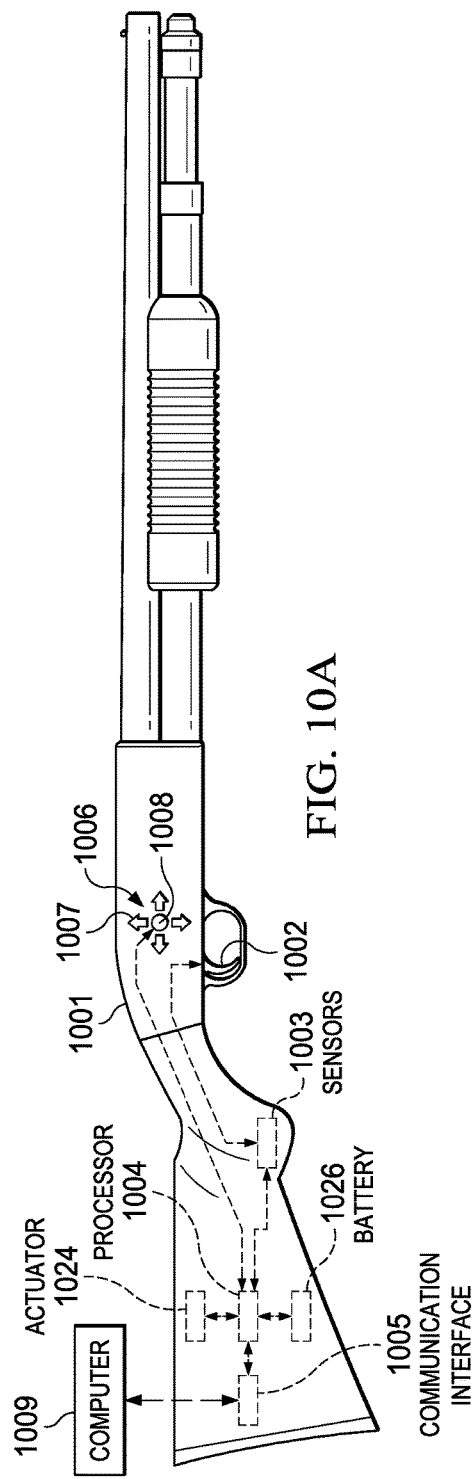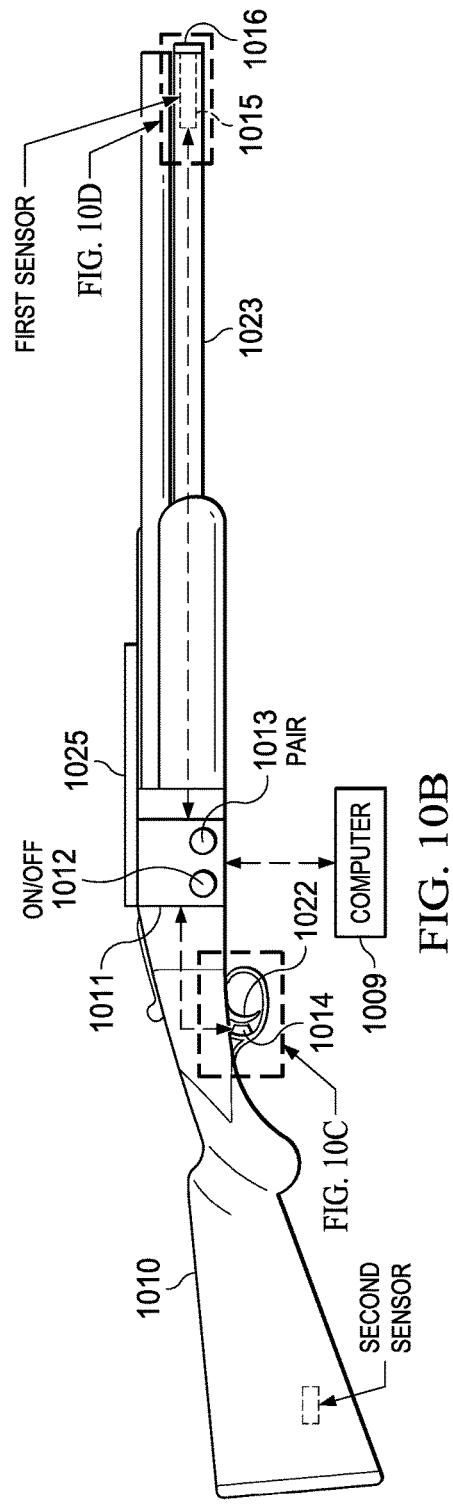

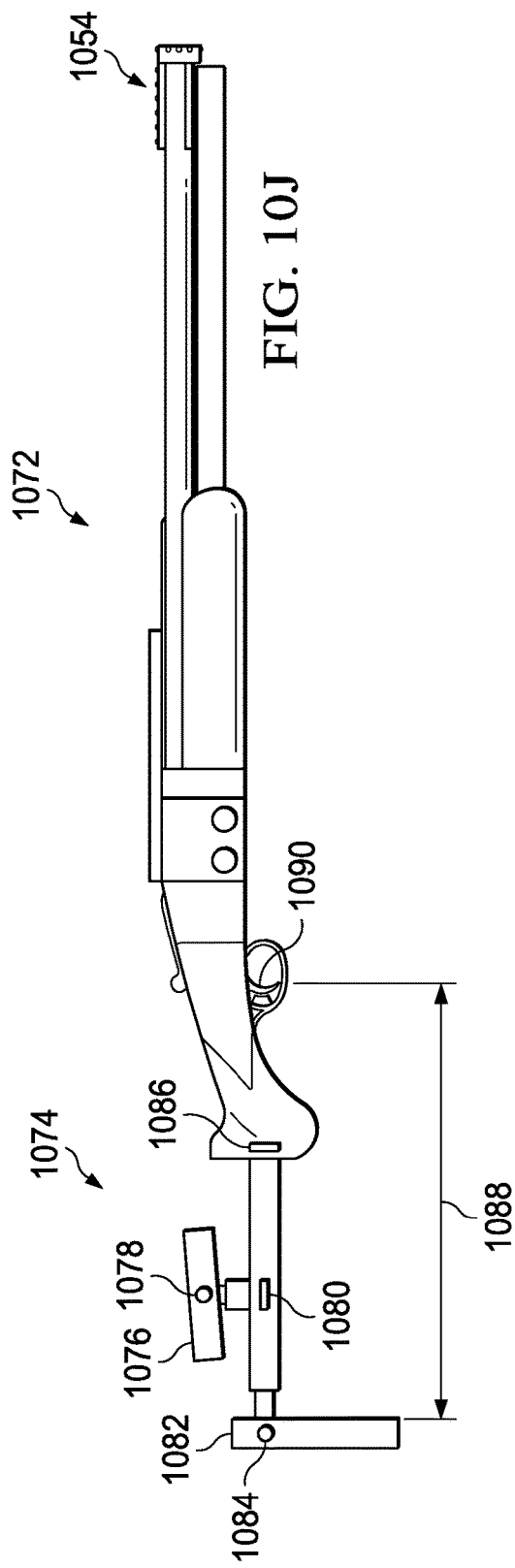

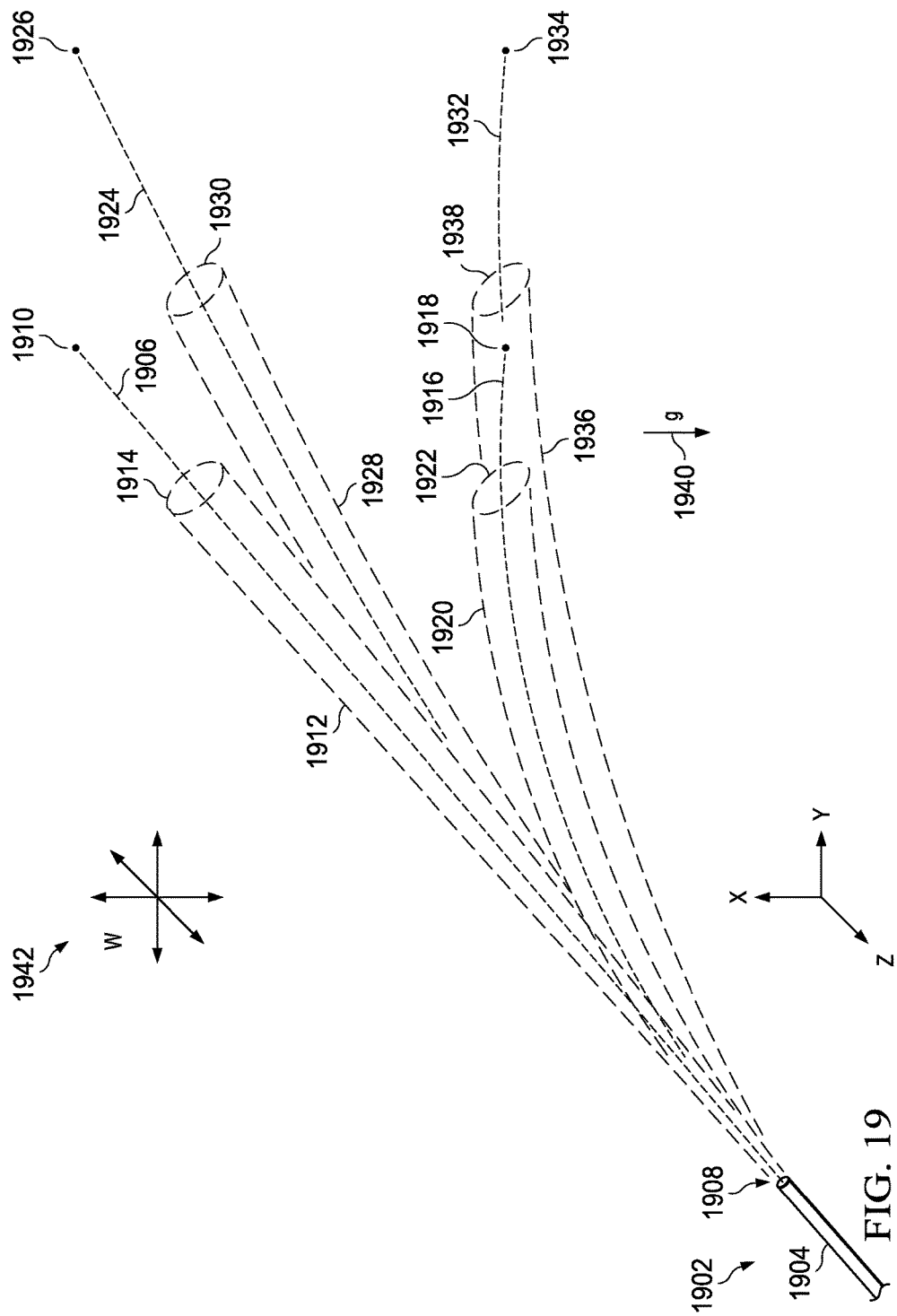

SYSTEM AND METHOD FOR MARKSMANSHIP TRAINING

CROSS REFERENCE TO RELATED APPLICATION

This application is a continuation in part of U.S. patent application Ser. No. 14/686,398 filed Apr. 14, 2015, which is a continuation in part of U.S. patent application Ser. No. 14/149,418 filed Jan. 7, 2014, which is a continuation in part of U.S. patent application Ser. No. 13/890,997 filed May 9, 2013. Each of the patent applications identified above is incorporated herein by reference in its entirety to provide continuity of disclosure.

FIELD OF THE INVENTION

The present invention relates to devices for teaching marksmen how to properly lead a moving target with a weapon. More particularly, the invention relates to optical projection systems to monitor and simulate trap, skeet, and sporting clay shooting.

BACKGROUND OF THE INVENTION

Marksmen typically train and hone their shooting skills by engaging in skeet, trap or sporting clay shooting at a shooting range. The objective for a marksman is to successfully hit a moving target by tracking at various distances and angles and anticipating the delay time between the shot and the impact. In order to hit the moving target, the marksman must aim the weapon ahead of and above the moving target by a distance sufficient to allow a projectile fired from the weapon sufficient time to reach the moving target. The process of aiming the weapon ahead of the moving target is known in the art as "leading the target." "Lead" is defined as the distance between the moving target and the aiming point. The correct lead distance is critical to successfully hit the moving target. Further, the correct lead distance is increasingly important as the distance of the marksman to the moving target increases, the speed of the moving target increases, and the direction of movement becomes more oblique.

FIG. 1 depicts the general dimensions of a skeet shooting range. Skeet shooting range 100 has high house 101 and low house 102 separated by distance 111. Distance 111 is about 120 feet. Station 103 is adjacent high house 101. Station 109 is adjacent low house 102. Station 110 is equidistant from high house 101 and low house 102 at distance 112. Distance 112 is about 60 feet. Station 106 is equidistant from high house 101 and low house 102 and generally perpendicular to distance 111 at distance 113. Distance 113 is 45 feet. Station 106 is distance 114 from station 103. Distance 114 is about 75 feet. Stations 104 and 105 are positioned along arc 121 between stations 103 and 106 at equal arc lengths. Each of arc lengths 122, 123, and 124 is about 27 feet. Stations 107 and 108 are positioned along arc 121 between stations 106 and 109 at equal arc lengths. Each of arc lengths 125, 126, and 127 is 26 feet, 8⅜ inches.

Target flight path 116 extends from high house 101 to marker 117. Marker 117 is positioned about 130 feet from high house 101 along target flight path 115. Target flight path 115 extends from low house 102 to marker 118. Marker 118 is about 130 feet from low house 102 along target flight path 116. Target flight paths 115 and 116 intersect at target crossing point 119. Target crossing point 119 is positioned distance 120 from station 110 and is 15 feet above the ground. Distance 120 is 18 feet. Clay targets are launched from high house 101 and low house 102 along target flight paths 115 and 116, respectively. Marksman 128 positioned at any of stations 103, 104, 105, 106, 107, 108, 109, and 110 attempts to shoot and break the launched clay targets.

FIG. 2 depicts the general dimensions of a trap shooting range. Trap shooting range 200 comprises firing lanes 201 and trap house 202. Stations 203, 204, 205, 206, and 207 are positioned along radius 214 from center 218 of trap house 202. Radius 214 is distance 216 from center 218. Distance 216 is 48 feet. Each of stations 203, 204, 205, 206, and 207 is positioned at radius 214 at equal arc lengths. Arc length 213 is 9 feet. Stations 208, 209, 210, 211, and 212 are positioned along radius 215 from center 218. Radius 215 is distance 217 from center 218. Distance 217 is 81 feet. Each of stations 208, 209, 210, 211, and 212 is positioned at radius 215 at equal arc lengths. Arc length 227 is 12 feet. Field 226 has length 221 from center 218 along center line 220 of trap house 202 to point 219. Length 221 is 150 feet. Boundary line 222 extends 150 feet from center 218 at angle 224 from center line 220. Boundary line 223 extends 150 feet from center 218 at angle 225 from center line 220. Angles 224 and 225 are each 22° from center line 220. Trap house 202 launches clay targets at various trajectories within field 226. Marksman 228 positioned at any of stations 203, 204, 205, 206, 207, 208, 209, 210, 211, and 212 attempts to shoot and break the launched clay targets.

FIGS. 3A, 3B, 3C, and 3D depict examples of target paths and associated projectile paths illustrating the wide range of lead distances and distances required of the marksman. The term "projectile," as used in this application, means any projectile fired from a weapon but more typically a shotgun round comprised of pellets of various sizes. For example, FIG. 3A shows a left to right trajectory 303 of target 301 and left to right intercept trajectory 304 for projectile 302. In this example, the intercept path is oblique, requiring the lead to be a greater distance along the positive X axis. FIG. 3B shows a left to right trajectory 307 of target 305 and intercept trajectory 308 for projectile 306. In this example, the intercept path is acute, requiring the lead to be a lesser distance in the positive X direction. FIG. 3C shows a right to left trajectory 311 of target 309 and intercepting trajectory 312 for projectile 310. In this example, the intercept path is oblique and requires a greater lead in the negative X direction. FIG. 3D shows a proximal to distal and right to left trajectory 315 of target 313 and intercept trajectory 316 for projectile 314. In this example, the intercept path is acute and requires a lesser lead in the negative X direction.

FIGS. 4A and 4B depict a range of paths of a clay target and an associated intercept projectile. The most typical projectile used in skeet and trap shooting is a shotgun round, such as a 12 gauge round or a 20 gauge round. When fired, the pellets of the round spread out into a "shot string" having a generally circular cross-section. The cross-section increases as the flight time of the pellets increases. Referring to FIG. 4A, clay target 401 moves along path 402. Shot string 403 intercepts target 401. Path 402 is an ideal path, in that no variables are considered that may alter path 402 of clay target 401 once clay target 401 is launched.

Referring to FIG. 4B, path range 404 depicts a range of potential flight paths for a clay target after being released on a shooting range. The flight path of the clay target is affected by several variables. Variables include mass, wind, drag, lift force, altitude, humidity, and temperature, resulting in a range of probable flight paths, path range 404. Path range 404 has upper limit 405 and lower limit 406. Path range 404 from launch angle θ is extrapolated using:

$$x = x_o + v_{xo}t + \tfrac{1}{2}a_x t^2 + C_x \qquad \text{Eq. 1}$$

$$y = y_o + v_{yo}t + \tfrac{1}{2}a_y t^2 + C_y \qquad \text{Eq. 2}$$

where x is the clay position along the x-axis, $x_o$ is the initial position of the clay target along the x-axis, $v_{xo}$ is the initial velocity along the x-axis, $a_x$ is the acceleration along the x-axis, t is time, and $C_x$ is the drag and lift variable along the x-axis, y is the clay position along the y-axis, $y_o$ is the initial position of the clay target along the y-axis, $v_{yo}$ is the initial velocity along the y-axis, $a_y$ is the acceleration along the y-axis, t is time, and $C_y$ is the drag and lift variable along the x-axis. Upper limit 405 is a maximum distance along the x-axis with $C_x$ at a maximum and a maximum along the y-axis with $C_y$ at a maximum. Lower limit 406 is a minimum distance along the x-axis with $C_x$ at a minimum and a minimum along the y-axis with $C_y$ at a minimum. Drag and lift are given by:

$$F_{drag} = \tfrac{1}{2}\rho v^2 C_D A \qquad \text{Eq. 3}$$

where $F_{drag}$ is the drag force, $\rho$ is the density of the air, $v$ is $v_o$, A is the cross-sectional area, and $C_D$ is the drag coefficient;

$$F_{lift} = \tfrac{1}{2}\rho v^2 C_L A \qquad \text{Eq. 4}$$

where $F_{lift}$ is the lift force, $\rho$ is the density of the air, $v$ is $v_o$, A is the planform area, and $C_L$ is the lift coefficient.

Referring to FIG. 5, an example of lead from the perspective of the marksman is described. Marksman 501 aims weapon 502 at clay target 503 moving along path 504 left to right. In order to hit target 503, marksman 501 must anticipate the time delay for a projectile fired from weapon 502 to intercept clay target 503 by aiming weapon 502 ahead of clay target 503 at aim point 505. Aim point 505 is lead distance 506 ahead of clay target 503 along path 504. Marksman 501 must anticipate and adjust aim point 505 according to a best guess at the anticipated path of the target.

Clay target 503 has initial trajectory angles $\gamma$ and $\beta$, positional coordinates $x_1$, $y_1$ and a velocity $v_1$. Aim point 505 has coordinates $x_2$, $y_2$. Lead distance 506 has x-component 507 and y-component 508. X-component 507 and y-component 508 are calculated by:

$$\Delta x = x_2 - x_1 \qquad \text{Eq. 5}$$

$$\Delta y = y_2 - y_1 \qquad \text{Eq. 6}$$

where $\Delta x$ is x component 507 and $\Delta y$ is y component 508. As $\gamma$ increases, $\Delta y$ must increase. As $\gamma$ increases, $\Delta x$ must increase. As $\beta$ increases, $\Delta y$ must increase.

The prior art has attempted to address the problems of teaching proper lead distance with limited success. For example, U.S. Pat. No. 3,748,751 to Breglia, et al. discloses a laser, automatic fire weapon simulator. The simulator includes a display screen, a projector for projecting a motion picture on the display screen. A housing attaches to the barrel of the weapon. A camera with a narrow band-pass filter positioned to view the display screen detects and records the laser light and the target shown on the display screen. However, the simulator requires the marksman to aim at an invisible object, thereby making the learning process of leading a target difficult and time-consuming.

U.S. Pat. No. 3,940,204 to Yokoi discloses a clay shooting simulation system. The system includes a screen, a first projector providing a visible mark on the screen, a second projector providing an infrared mark on the screen, a mirror adapted to reflect the visible mark and the infrared mark to the screen, and a mechanical apparatus for moving the mirror in three dimensions to move the two marks on the screen such that the infrared mark leads the visible mark to simulate a lead-sighting point in actual clay shooting. A light receiver receives the reflected infrared light. However, the system in Yokoi requires a complex mechanical device to project and move the target on the screen, which leads to frequent failure and increased maintenance.

U.S. Pat. No. 3,945,133 to Mohon, et al. discloses a weapons training simulator utilizing polarized light. The simulator includes a screen and a projector projecting a two-layer film. The two-layer film is formed of a normal film and a polarized film. The normal film shows a background scene with a target with non-polarized light. The polarized film shows a leading target with polarized light. The polarized film is layered on top of the normal non-polarized film. A polarized light sensor is mounted on the barrel of a gun. However, the weapons training simulator requires two cameras and two types of film to produce the two-layered film making the simulator expensive and time-consuming to build and operate.

U.S. Pat. No. 5,194,006 to Zaenglein, Jr. discloses a shooting simulator. The simulator includes a screen, a projector for displaying a moving target image on the screen, and a weapon connected to the projector. When a marksman pulls the trigger a beam of infrared light is emitted from the weapon. A delay is introduced between the time the trigger is pulled and the beam is emitted. An infrared light sensor detects the beam of infrared light. However, the training device in Zaenglein, Jr. requires the marksman to aim at an invisible object, thereby making the learning process of leading a target difficult and time-consuming.

U.S. Patent Publication No. 2010/0201620 to Sargent discloses a firearm training system for moving targets. The system includes a firearm, two cameras mounted on the firearm, a processor, and a display. The two cameras capture a set of stereo images of the moving target along the moving target's path when the trigger is pulled. However, the system requires the marksman to aim at an invisible object, thereby making the learning process of leading a target difficult and time-consuming. Further, the system requires two cameras mounted on the firearm making the firearm heavy and difficult to manipulate leading to inaccurate aiming and firing by the marksman when firing live ammunition without the mounted cameras.

The prior art fails to disclose or suggest a system and method for simulating a lead for a moving target using generated images of targets projected at the same scale as viewed in the field and a phantom target positioned ahead of the targets having a variable contrast. The prior art further fails to disclose or suggest a system and method for simulating lead in a virtual reality system. Therefore, there is a need in the art for a shooting simulator that recreates moving targets at the same visual scale as seen in the field with a phantom target to teach proper lead of a moving target in a virtual reality platform.

SUMMARY

A system and method for simulating lead of a target includes a network, a simulation administrator connected to the network, a database connected to the simulation administrator, and a user device connected to the network. The user device includes a set of virtual reality unit, and a computer connected to the virtual reality unit and to the network. A set of position trackers are connected to the computer.

In a preferred embodiment, a target is simulated. In one embodiment, a simulated weapon is provided. In another embodiment, a set of sensors is attached to a real weapon. In another embodiment, a set of gloves having a set of sensors is worn by a user. The system generates a simulated target and displays the simulated target upon launch of the generated target. The computer tracks the position of the generated target and the position of the virtual reality unit and the weapon to generate a phantom target and a phantom halo. The generated phantom target and the generated phantom halo are displayed on the virtual reality unit at a lead distance and a drop distance from the live target as viewed through the virtual reality unit. The computer determines a hit or a miss of the generated target using the weapon, the phantom target, and the phantom halo. In one embodiment, the disclosed system and method is implemented in a two-dimensional video game.

The present disclosure provides a system which embodies significantly more than an abstract idea including technical advancements in the field of data processing and a transformation of data which is directly related to real world objects and situations. The disclosed embodiments create and transform imagery in hardware, for example, a weapon peripheral and a sensor attachment to a real weapon.

BRIEF DESCRIPTION OF THE DRAWINGS

The disclosed embodiments will be described with reference to the accompanying drawings.

FIG. 10A is a side view of a simulated weapon for a virtual reality system of a preferred embodiment.
FIG. 10B is a side view of a real weapon with a set of sensors attached for a virtual reality system of a preferred embodiment.
FIG. 10J is a side view of a weapon with an adjustable stock for a virtual reality simulator system of a preferred embodiment.
FIG. 19 is a simulation view that shows beams being projected from a barrel of a weapon of a preferred embodiment.

DETAILED DESCRIPTION

Figure 1:
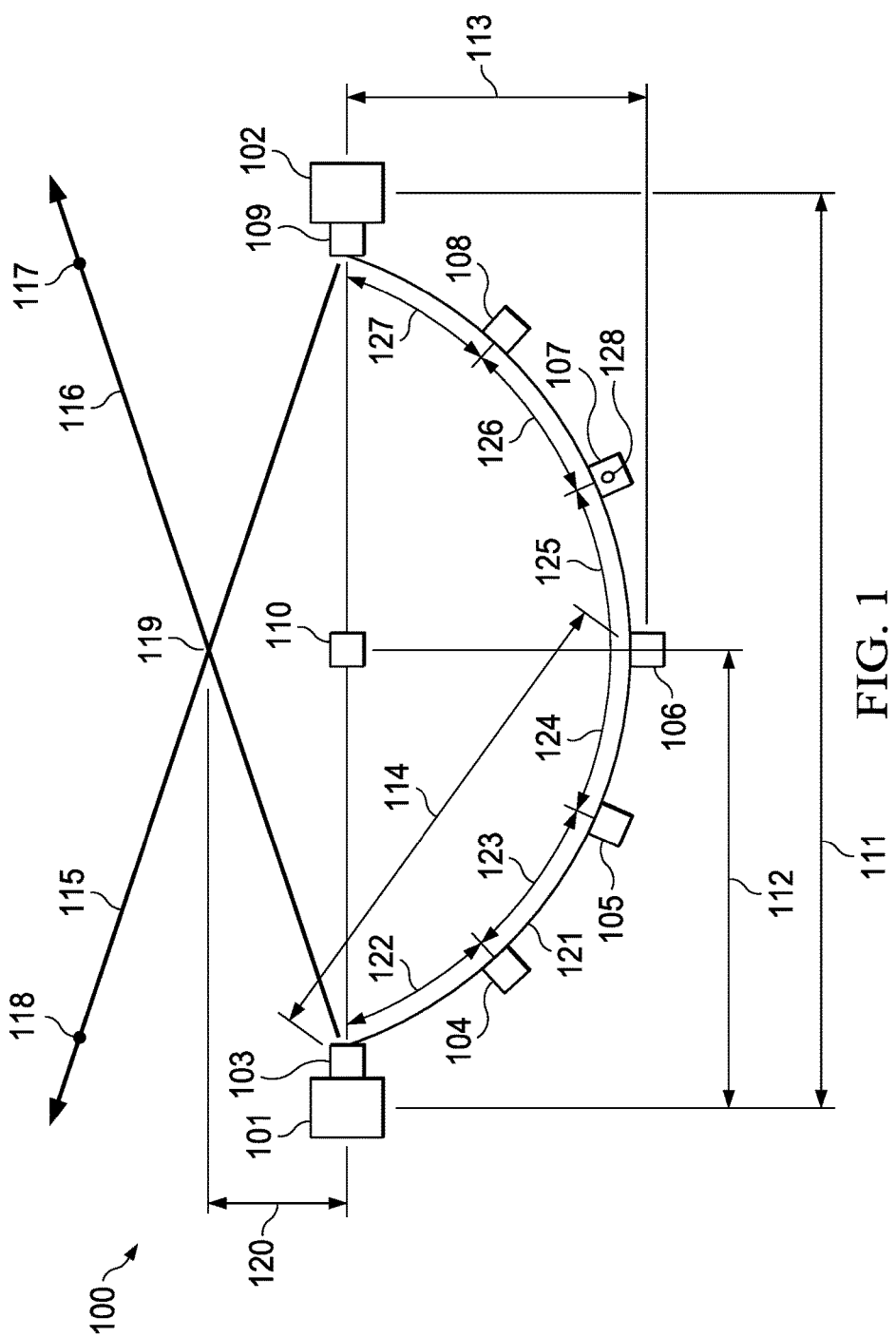
FIG. 1 is a plan view of a skeet shooting range.
Figure 2:
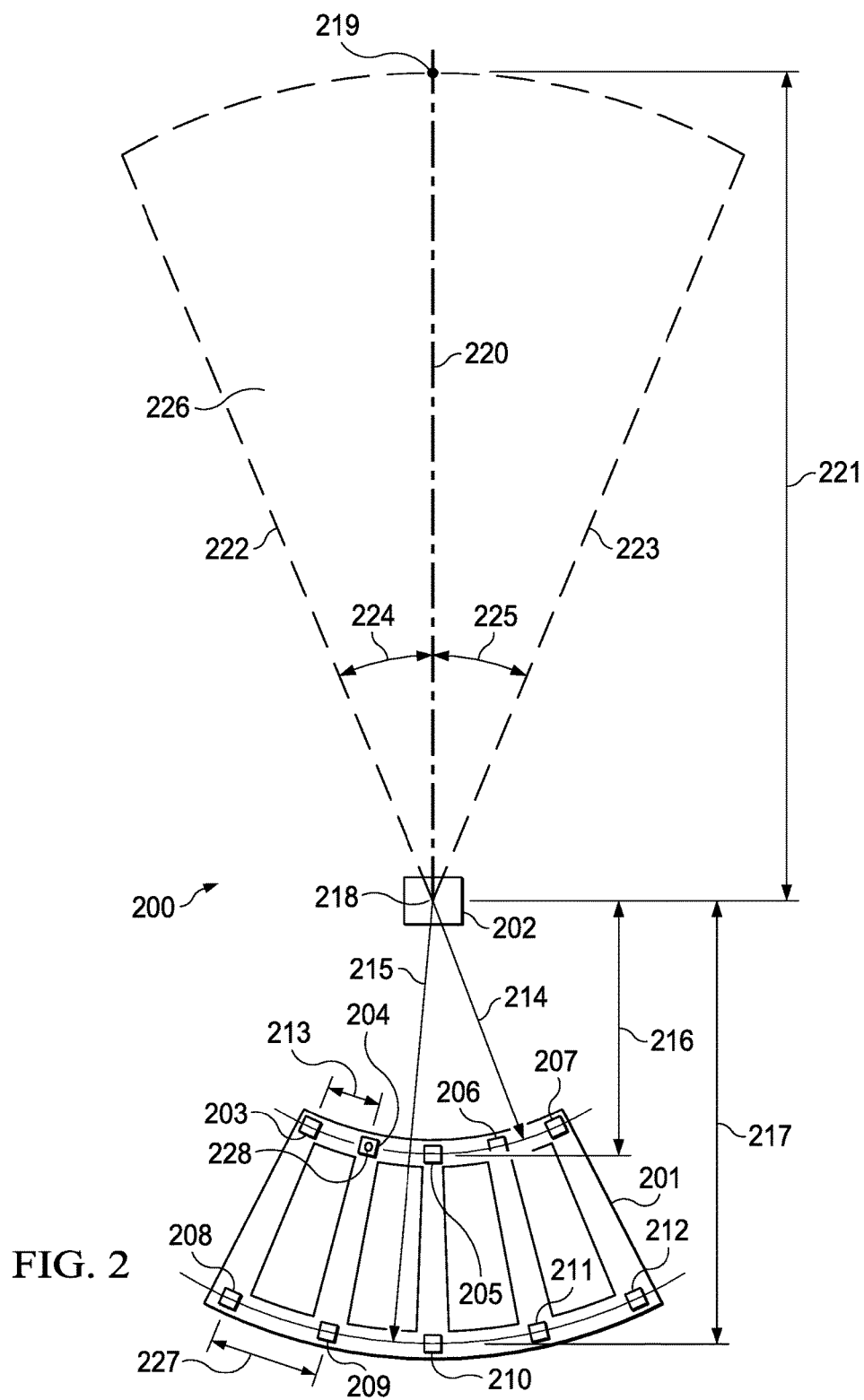
FIG. 2 is a plan view of a trap shooting range.
Figure 3A:
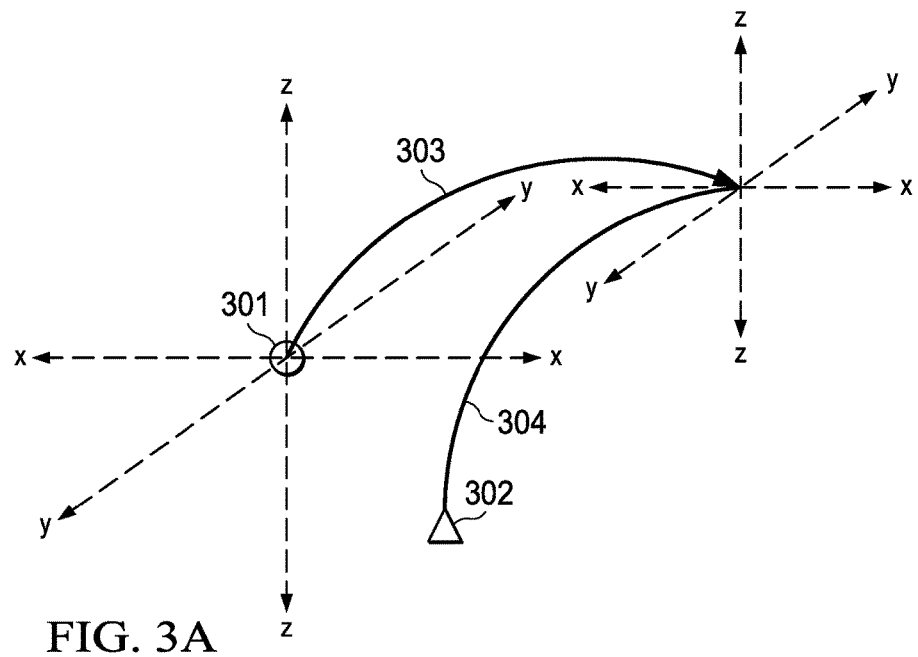
FIG. 3A is a target path and an associated projectile path.
Figure 3B:
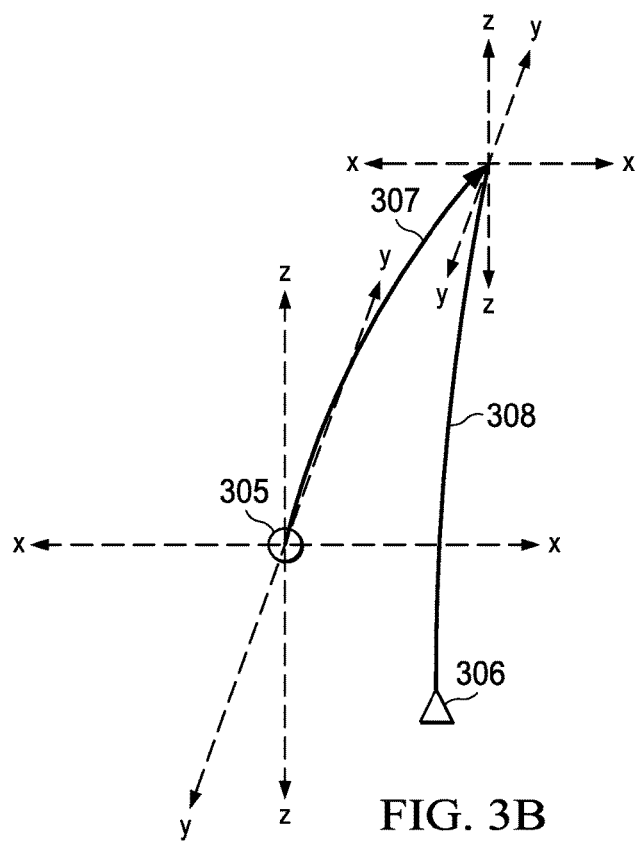
FIG. 3B is a target path and an associated projectile path.
Figure 3C:
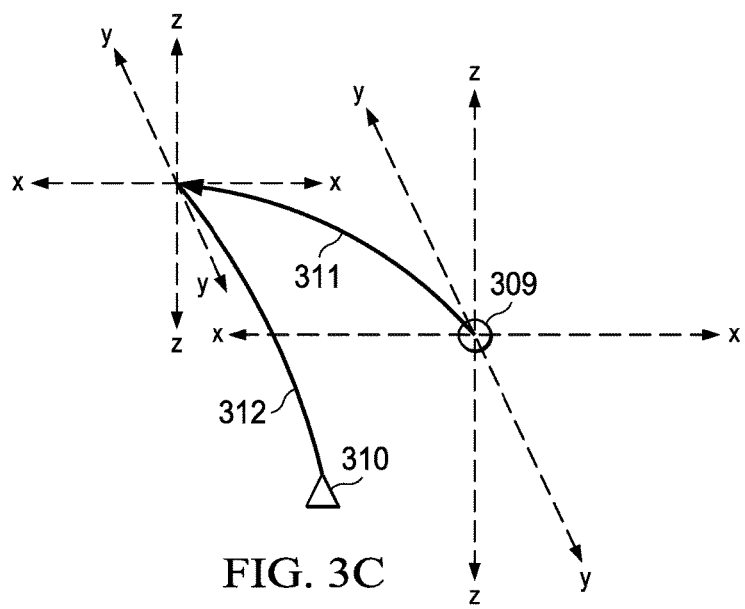
FIG. 3C is a target path and an associated projectile path.
Figure 3D:
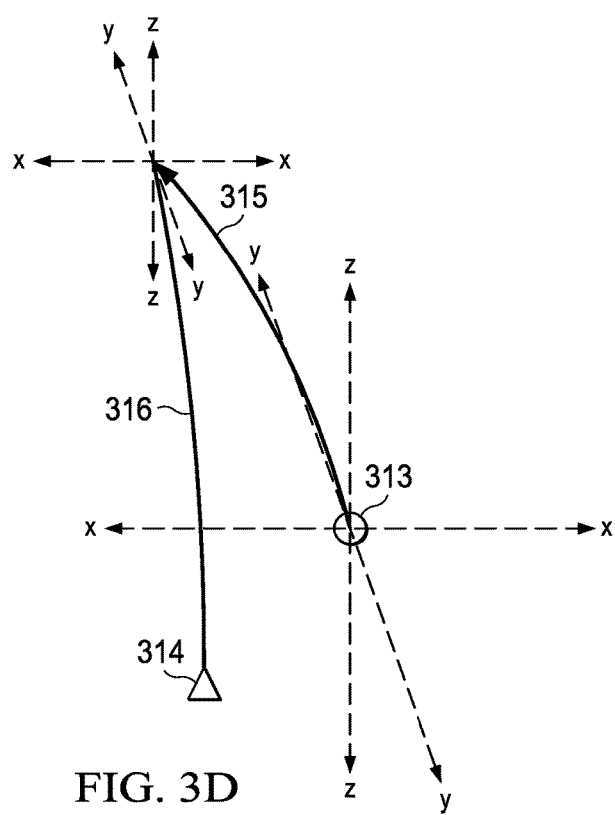
FIG. 3D is a target path and an associated projectile path.
Figure 4A:
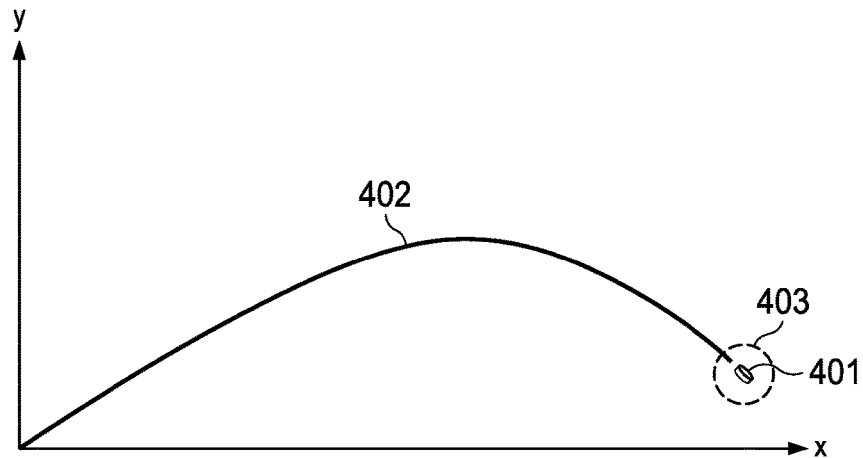
FIG. 4A is an ideal path of a moving target.
Figure 4B:
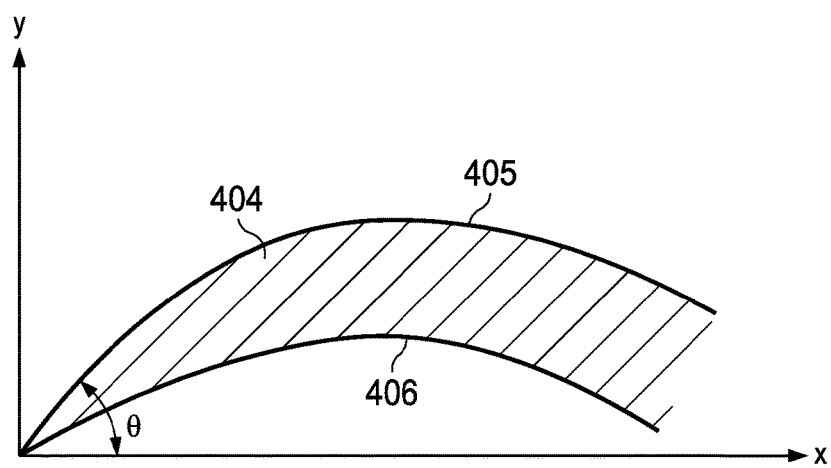
FIG. 4B is a range of probable flight paths of a target.
Figure 5:
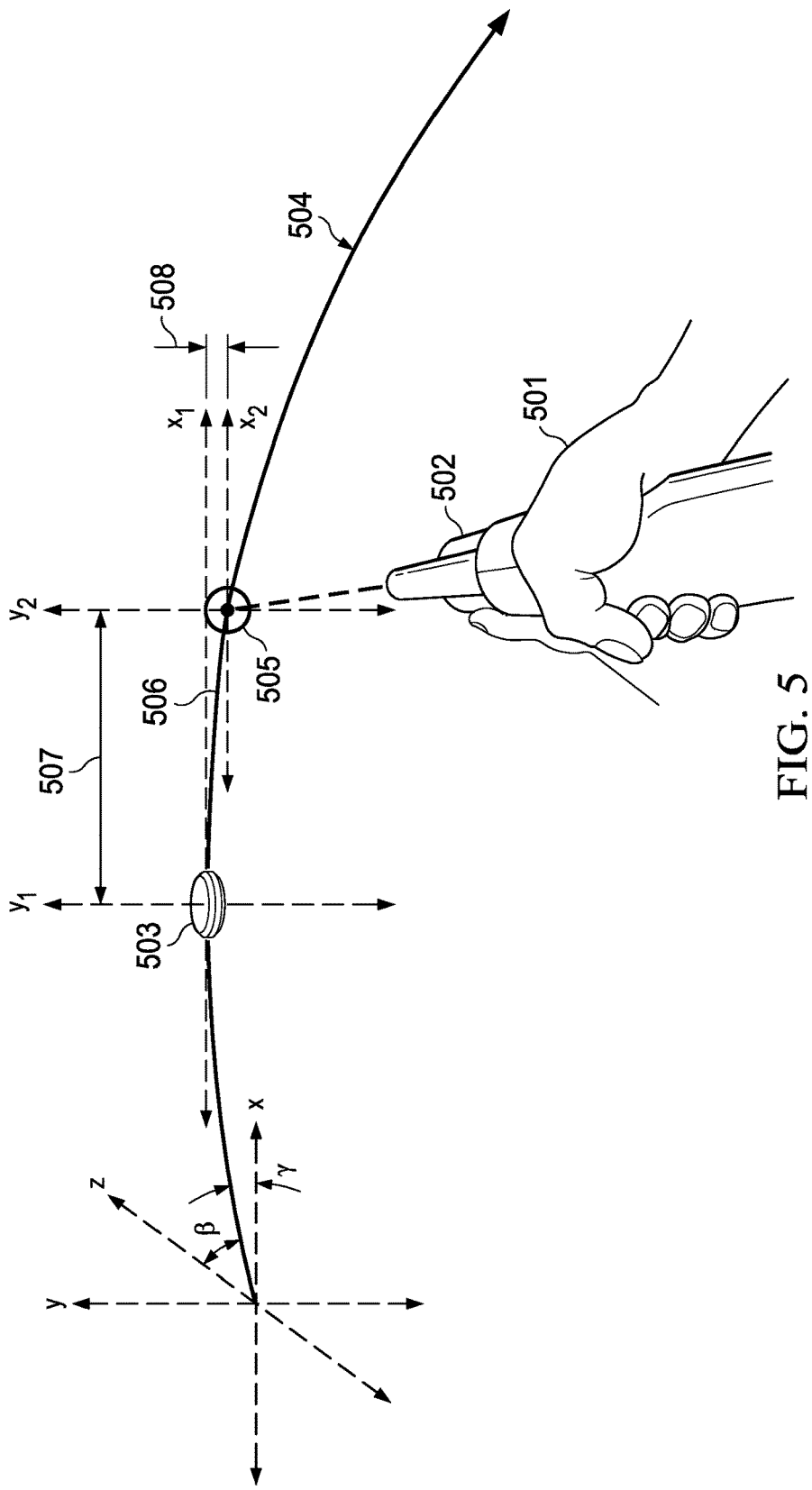
FIG. 5 is a perspective view of a marksman aiming at a moving target.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 6:
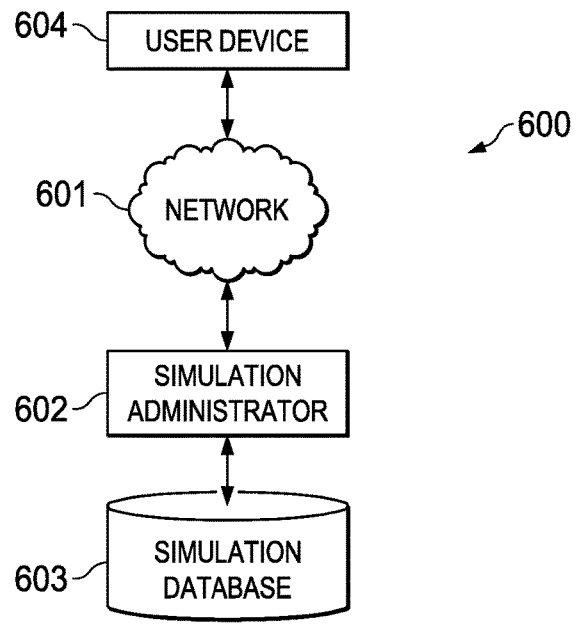
FIG. 6 is a schematic of a simulator system of a preferred embodiment.

Referring to FIG. 6, system 600 includes network 601, simulation administrator 602 connected to network 601, and user device 604 connected to network 601. System administrator 602 is further connected to simulation database 603 for storage of relevant data. For example, data includes a set of target data, a set of weapon data, and a set of environment data.

In one embodiment, network 601 is a local area network. In another embodiment, network 601 is a wide area network, such as the internet. In other embodiments, network 601 includes a combination of wide area networks and local area networks, includes cellular networks.

In a preferred embodiment, user device 604 communicates with simulation administrator 602 to access database 603 to generate and project a simulation that includes a target, a phantom, and a phantom halo adjacent to the target as will be further described below.

In another embodiment, simulation administrator 602 generates a simulation that includes a target, a phantom, a phantom halo adjacent to the target, and a weapon image as will be further described below and sends the simulation to user device for projection.

Figure 7:
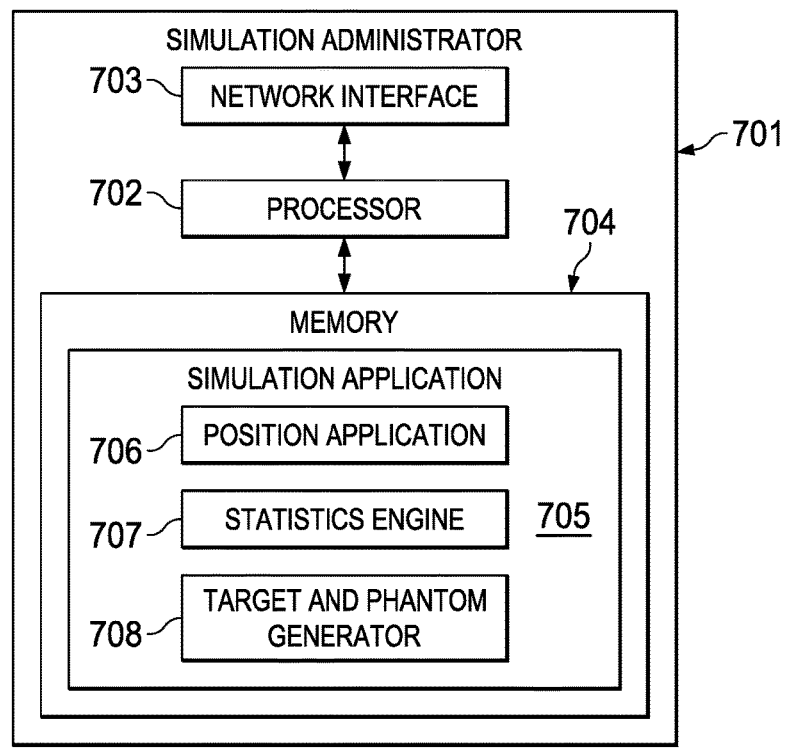
FIG. 7 is a schematic of a simulation administrator of a preferred embodiment.

Referring to FIG. 7, simulation administrator 701 includes processor 702, network interface 703 connected to processor 702, and memory 704 connected to processor 702. Simulation application 705 is stored in memory 704 and executed by processor 702. Simulation application 705 includes position application 706, statistics engine 707, and target and phantom generator 708.

In a preferred embodiment, simulation administrator 701 is a PowerEdge C6100 server and includes a PowerEdge C410x PCIe Expansion Chassis available from Dell Inc. Other suitable servers, server arrangements, and computing devices known in the art may be employed.

In one embodiment, position application 706 communicates with a position tracker connected to the user device to detect the position of the user device for simulation application 705. Statistics engine 707 communicates with a database to retrieve relevant data and generate renderings according desired simulation criteria, such as desired weapons, environments, and target types for simulation application 705. Target and phantom generator 708 calculates and generates a target along a target path, a phantom target, and a phantom halo for the desired target along a phantom path for simulation application, as will be further described below.

Figure 8:
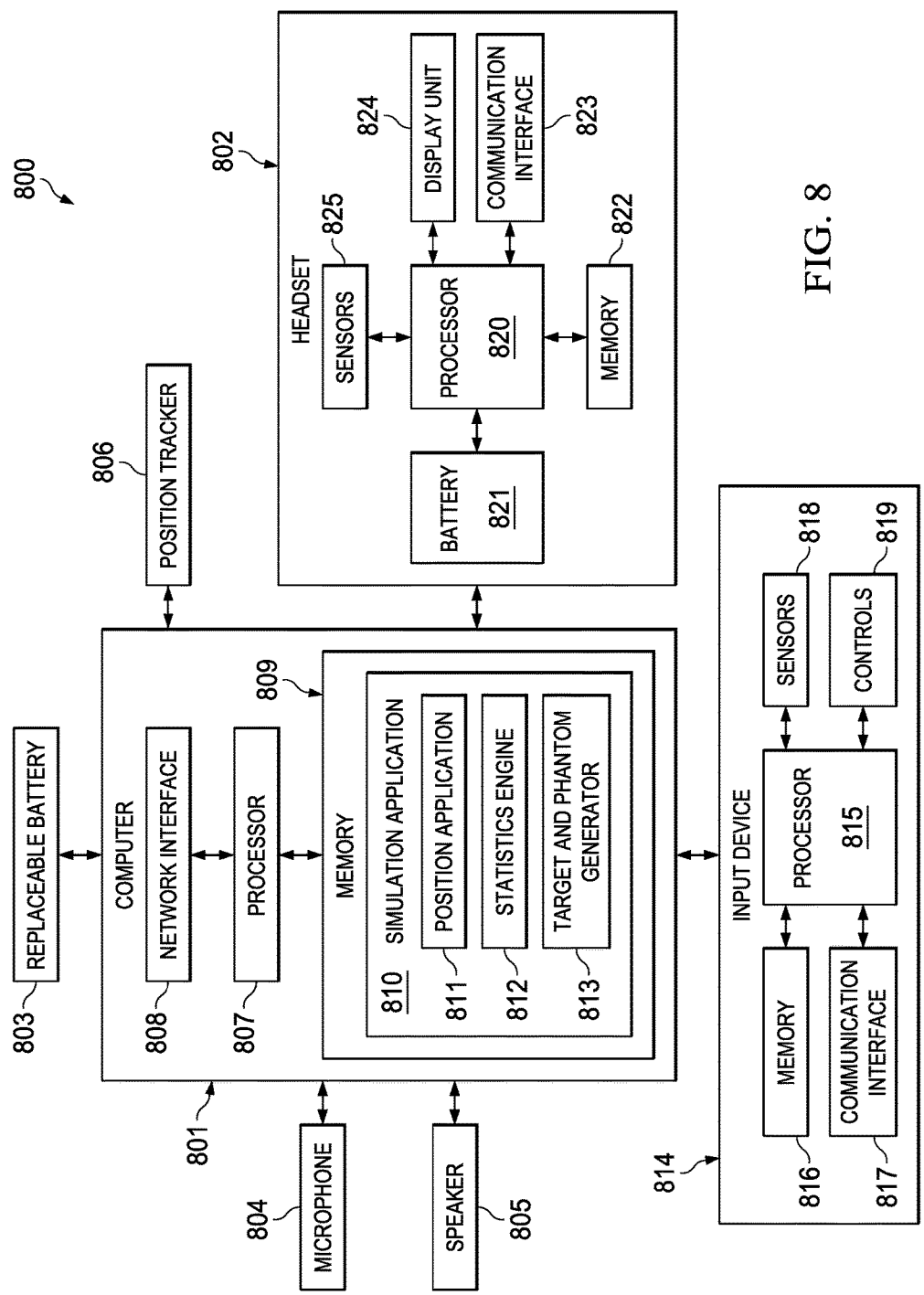
FIG. 8 is a schematic of a user device of a simulator system of a preferred embodiment.

Referring to FIG. 8, user device 800 includes computer 801 connected to headset 802. Computer 801 is further connected to replaceable battery 803, microphone 804, speaker 805, and position tracker 806.

Computer 801 includes processor 807, memory 809 connected to processor 807, and network interface 808 connected to processor 807. Simulation application 810 is stored in memory 809 and executed by processor 807. Simulation application 810 includes position application 811, statistics engine 812, and target and phantom generator 813. In a preferred embodiment, position application 811 communicates with position tracker 806 to detect the position of headset 802 for simulation application 810. Statistics engine 812 communicates with a database to retrieve relevant data and generate renderings according desired simulation criteria, such as desired weapons, environments, and target types for simulation application 810. Target and phantom generator 813 calculates and generates a target along a target path, a phantom target, and a phantom halo for the desired target along a phantom path for simulation application 810, as will be further described below.

Input device 814 is connected to computer 801. Input device 814 includes processor 815, memory 816 connected to processor 815, communication interface 817 connected to processor 815, a set of sensors 818 connected to processor 816, and a set of controls 819 connected to processor 815.

In one embodiment, input device 814 is a simulated weapon, such as a shot gun, a rifle, or a handgun. In another embodiment, input device 814 is a set of sensors connected to a disabled real weapon, such as a shot gun, a rifle, or a handgun, to detect movement and actions of the real weapon. In another embodiment, input device 814 is a glove having a set of sensors worn by a user to detect positions and movements of a hand of a user.

Headset 802 includes processor 820, battery 821 connected to processor 820, memory 822 connected to processor 820, communication interface 823 connected to processor 820, display unit 824 connected to processor 820, and a set of sensors 825 connected to processor 820.

Figure 9A:
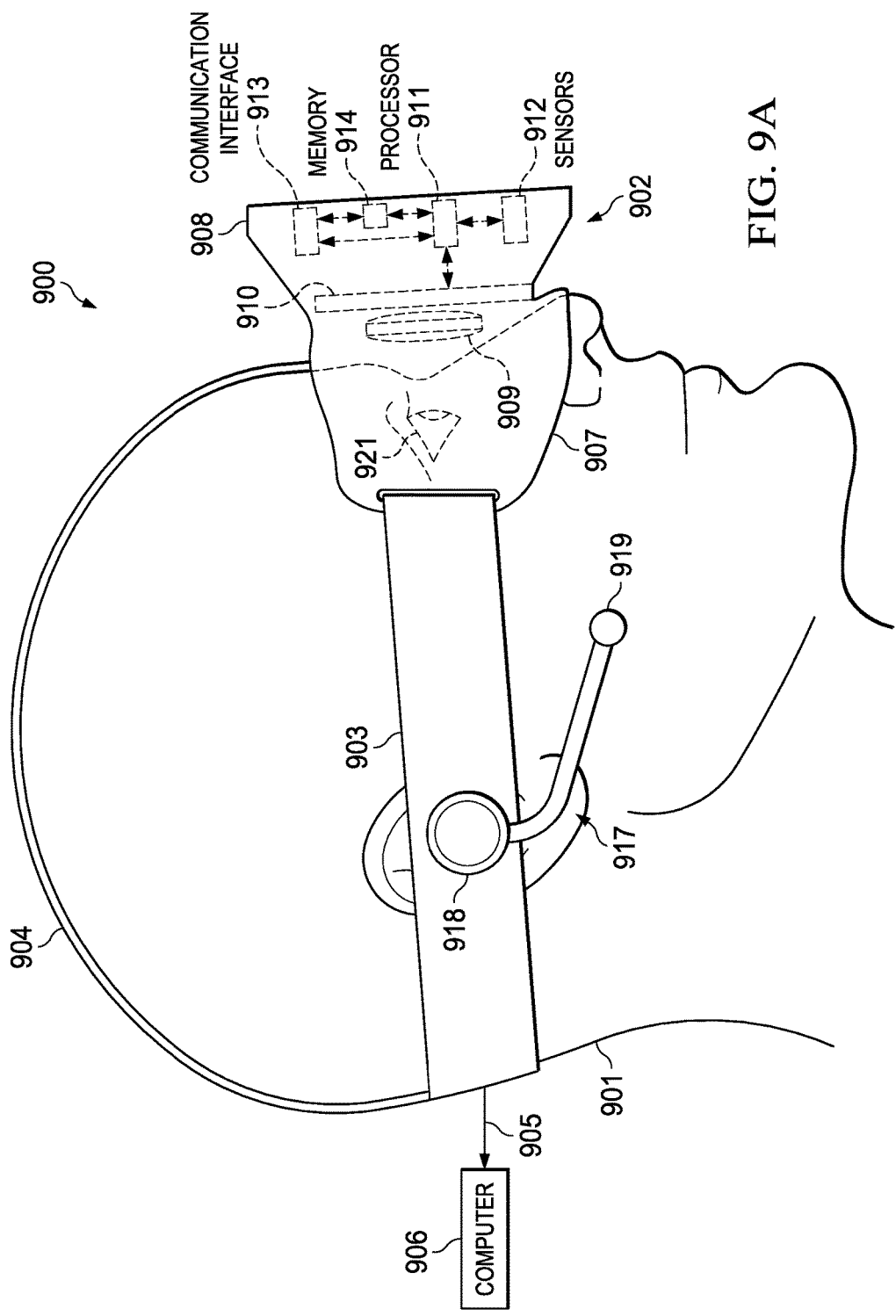
FIG. 9A is a side view of a user device of a virtual reality simulator system of a preferred embodiment.
Figure 9B:
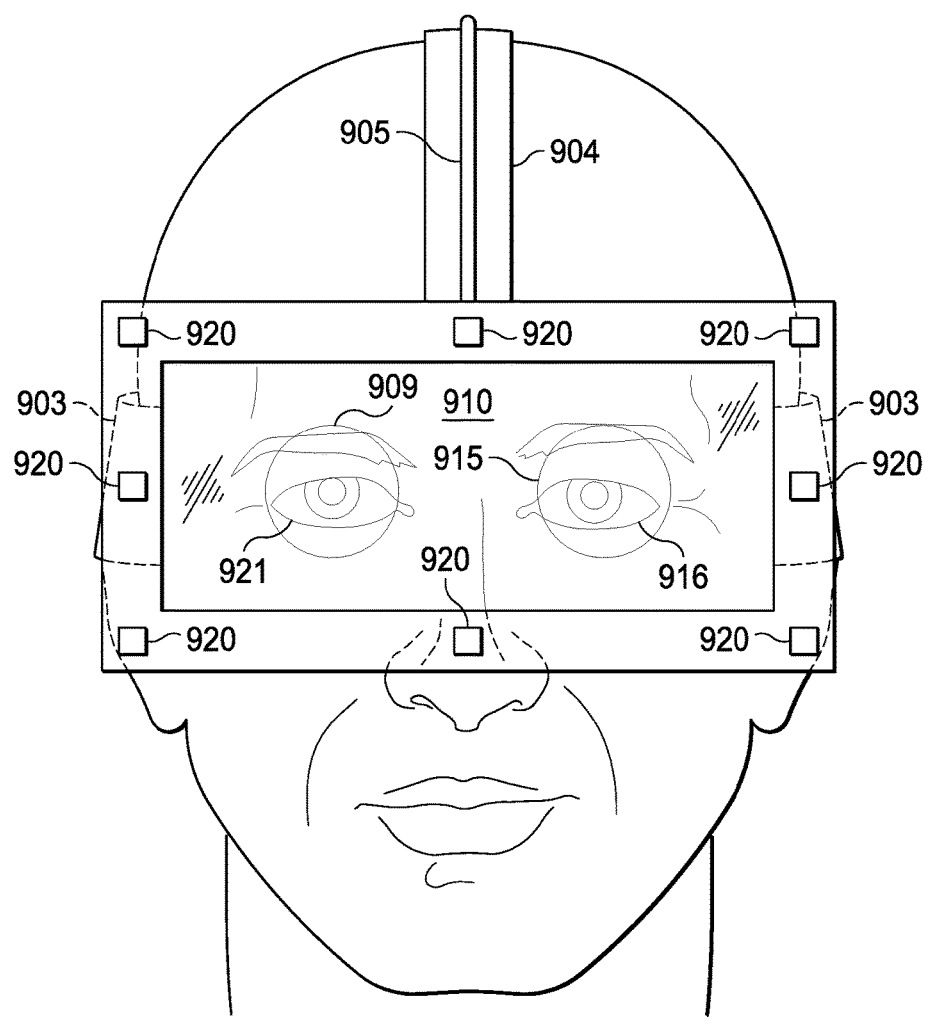
FIG. 9B is a front view of a user device of a virtual reality simulator system of a preferred embodiment.

Referring to FIGS. 9A and 9B, a preferred implementation of user device 800 is described as user device 900. User 901 wears virtual reality unit 902 having straps 903 and 904. Virtual reality unit 902 is connected to computer 906 via connection 905. Computer 906 is preferably a portable computing device, such as a laptop or tablet computer, worn by user 901. In other embodiments, computer 906 is a desktop computer or a server, not worn by the user. Any suitable computing device known in the art may be employed. Connection 905 provides a data and power connection from computer 906 to virtual reality unit 902.

Virtual reality unit 902 includes skirt 907 attached to straps 903 and 904 and display portion 908 attached to skirt 907. Skirt 907 covers eyes 908 and 916 of user 901. Display portion 908 includes processor 911, display unit 910 connected to processor 911, a set of sensors 912 connected to processor 911, communication interface 913 connected to processor 911, and memory 914 connected to processor 911. Lens 909 is positioned adjacent to display unit 910 and eye 908 of user 901. Lens 915 is positioned adjacent to display unit 910 and eye 916 of user 901. Virtual reality unit 902 provides a stereoscopic three-dimensional view of images to user 901.

User 901 wears communication device 917. Communication device 917 includes earpiece speaker 918 and microphone 919. Communication device 917 is preferably connected to computer 906 via a wireless connection such as a Bluetooth connection. In other embodiments, other wireless or wired connections are employed. Communication device 917 enables voice activation and voice control of a simulation application stored in the computer 906 by user 901.

In one embodiment, virtual reality unit 902 is the Oculus Rift headset available from Oculus VR, LLC. In another embodiment, virtual reality unit 902 is the HTC Vive headset available from HTC Corporation. In this embodiment, a set of laser position sensors 920 is attached to an external surface virtual reality unit 902 to provide position data of virtual reality unit 902. Any suitable virtual reality unit known in the art may be employed.

In certain embodiments, set of sensors 912 include sensors related to eye tracking. When the sensors related to eye tracking are based on infrared optical tracking, the set of sensors 912 includes one or more infrared light sources and one or more infrared cameras. Light from the infrared light sources is reflected from one or more surfaces of the user eye and is received by the infrared cameras. The reflected light is reduced to a digital signal which is representative of the positions of the user eye. These signals are transmitted to the computer. Computer 906 and processor 911 then determine the positioning and direction of the eyes of the user and record eye tracking data. With the eye tracking data, computer 906 determines whether the user is focusing on the simulated target or on the phantom target; how quickly a user focuses on the simulated target or phantom target; how long it takes for the user to aim the weapon after focusing on the simulated target or phantom target; how long the user focuses on the simulated target or phantom target before pulling the trigger; how long it takes the user to see and focus on the next target; whether the user's eyes were shut or closed before, during, or after the pull of the trigger; and so on. Computer 906 also determines eye training statistics based on the eye training data and the eye tracking data collected over multiple shots and rounds of the simulation. Feedback is given to the user that includes and is based on the eye tracking data, the eye training data, and the eye training statistics.

In certain embodiments, the laser position sensors 920 are light emitting diodes (LEDs) that act as markers that can be seen or sensed by one or more cameras or sensors. Data from the cameras or sensors is processed to derive the location and orientation of virtual reality unit 902 based on the LEDs. Each LED emits light using particular transmission characteristics, such as phase, frequency, amplitude, and duty cycle. The differences in the phase, frequency, amplitude, and duty cycle of the light emitted by the LEDs allows for a sensor to identify each LED by the LED's transmission characteristics. In certain embodiments, the LEDs on virtual reality unit 902 are spaced with placement characteristics so that there is a unique distance between any two LEDs, which gives the appearance of a slightly randomized placement on virtual reality unit 902. The transmission characteristics along with placement characteristics of the LEDs on virtual reality unit 902 allows the simulation system to determine the location and orientation of virtual reality unit 902 by sensing as few as three LEDs with a camera or other sensor.

In a preferred embodiment, a simulation environment that includes a target is generated by computer 906. Computer 906 further generates a phantom target and a phantom halo in front of the generated target based on a generated target flight path. The simulation environment including the generated target, the phantom target, and the phantom halo are transmitted from computer 906 to virtual reality unit 902 for viewing adjacent eyes 908 and 916 of user 901, as will be further described below. The user aims a weapon at the phantom target to attempt to shoot the generated target.

Referring FIG. 10A in one embodiment, simulated weapon 1001 includes trigger 1002 connected to set of sensors 1003, which is connected to processor 1004. Communication interface 1005 is connected to processor 1004 and to computer 1009. Battery 1026 is connected to processor 1004. Simulated weapon 1001 further includes a set of controls 1006 attached to an external surface of weapon 1001 and connected to processor 1004. Set of controls 1006 includes directional pad 1007 and selection button 1008. Battery 1026 is connected to processor 1004. Actuator 1024 is connected to processor 1004 to provide haptic feedback.

In a preferred embodiment, simulated weapon 1001 is a shotgun. It will be appreciated by those skilled in the art that other weapon types may be employed.

In one embodiment, simulated weapon 1001 is a Delta Six first person shooter controller available from Avenger Advantage, LLC. In another embodiment, simulated weapon 1001 is an airsoft weapon or air gun replica of a real weapon. Other suitable simulated weapons known in the art may be employed.

In a preferred embodiment, set of sensors 1003 includes a position sensor for trigger 1002 and a set of motion sensors to detect an orientation of weapon 1001.

In a preferred embodiment, the position sensor is a Hall Effect sensor. In this embodiment, a magnet is attached to trigger 1002. Other types of Hall Effect sensor or any other suitable sensor type known in the art may be employed.

In a preferred embodiment, the set of motion sensors is a 9-axis motion tracking system-in-package package sensor, model no. MP11-9150 available from InverSense®, Inc. In this embodiment, the 9-axis sensor combines a 3-axis gyroscope, a 3-axis accelerometer, an on-board digital motion processor, and a 3-axis digital compass. In other embodiments, other suitable sensors and/or suitable combinations of sensors may be employed.

Figure 10C:
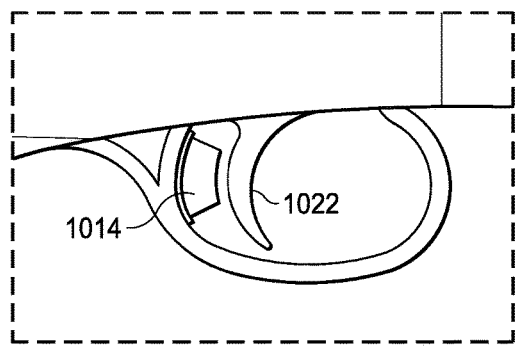
FIG. 10C is a detail view of a trigger sensor of a preferred embodiment.
Figure 10D:
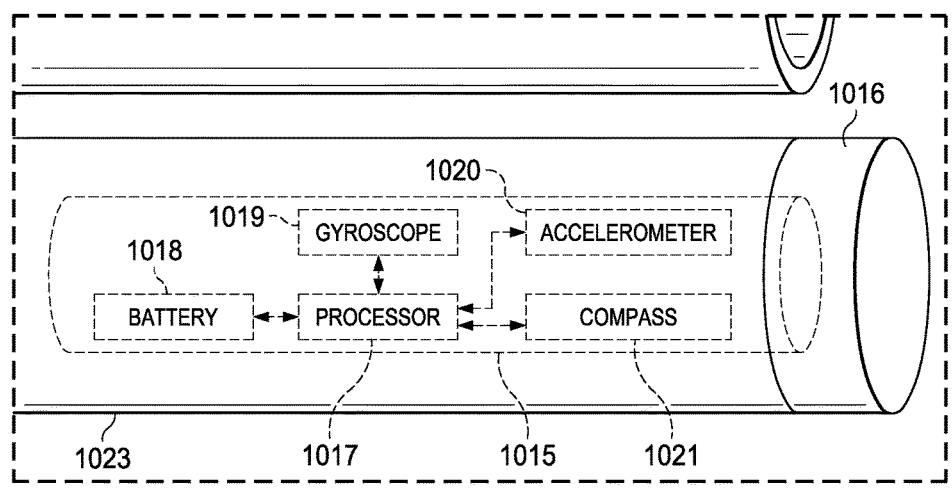
FIG. 10D is a detail view of a set of muzzle sensors of a preferred embodiment.

Referring to FIGS. 10B, 10C, and 10D in another embodiment, weapon 1010 includes simulation attachment 1011 removably attached to its stock. Simulation attachment 1011 includes on-off switch 1012 and pair button 1013 to communicate with computer 1009 via Bluetooth connection. Any suitable wireless connection may be employed. Trigger sensor 1014 is removably attached to trigger 1022 and in communication with simulation attachment 1011. A set of muzzle sensors 1015 is attached to a removable plug 1016 which is removable inserted into barrel 1023 of weapon 1010. Set of muzzle sensors 1015 include a processor 1017, battery 1018 connected to processor 1017, gyroscope 1019 connected to processor, accelerometer 1020 connected to processor 1017, and compass 1021 connected to processor 1017.

In one embodiment, set of muzzle sensors 1015 and removable plug 1016 are positioned partially protruding outside of barrel 1023 of weapon 1010.

In one embodiment, weapon 1010 includes rail 1025 attached to its stock in any position. In this embodiment, set of muzzle sensors 1015 is mounted to rail 1025.

In one embodiment, weapon 1010 fires blanks to provide live recoil to a user.

It will be appreciated by those skilled in the art that any weapon may be employed as weapon 1010, including any rifle or handgun. It will be further appreciated by those skilled in the art that rail 1025 is optionally mounted to any type of weapon. Set of muzzle sensors 1025 may be mounted in any position on weapon 1010. Any type of mounting means known in the art may be employed.

Figure 10E:
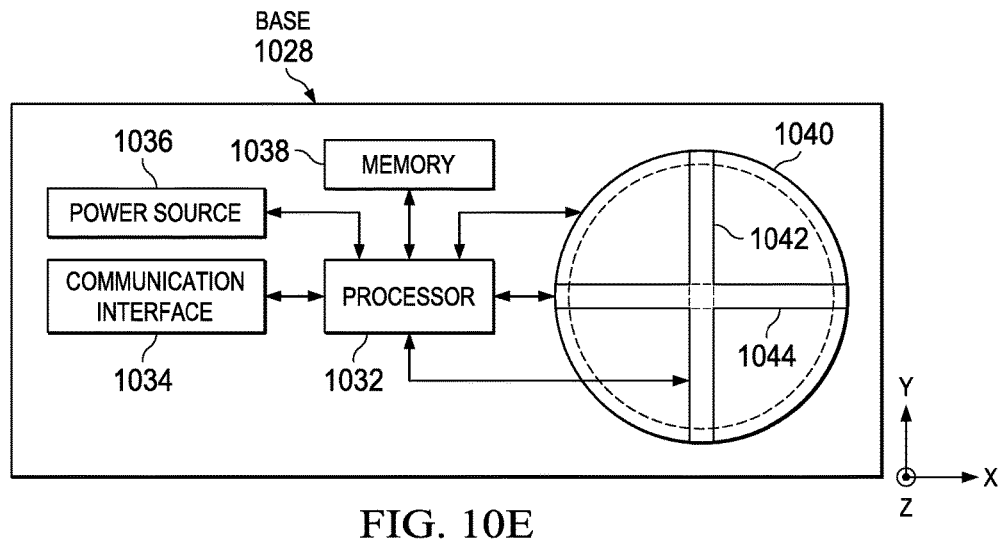
FIG. 10E is a detail view of a set of a transmitter base of a preferred embodiment.
Figure 10F:
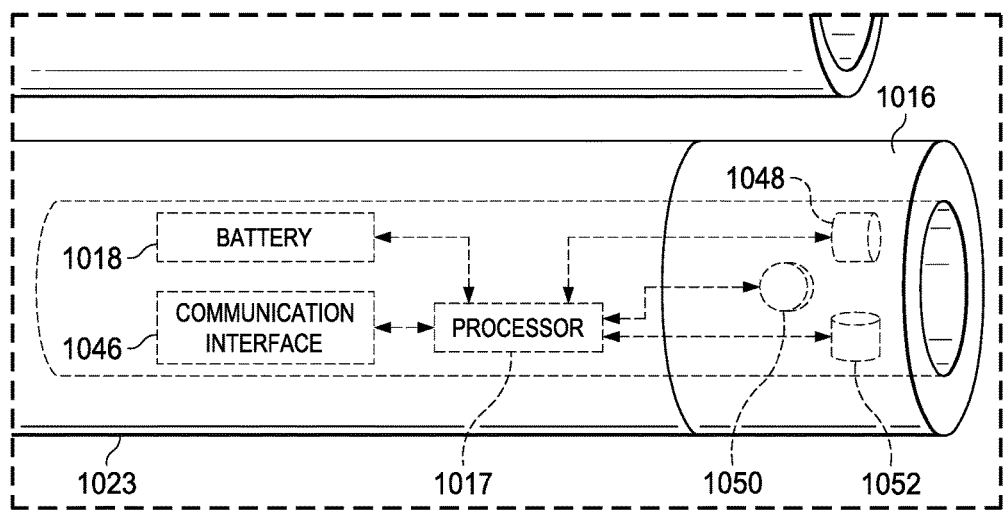
FIG. 10F is a detail view of a set of muzzle sensors used with the transmitter base of FIG. 10E of a preferred embodiment.

Referring to FIG. 10E, base 1028 comprises a sensor system that includes a magnetic field detector used to determine the location and orientation of a weapon, such as weapon 1010 with removable plug 1016 shown in FIG. 10F. Base 1028 includes processor 1032, which is connected to communication interface 1034, power source 1036, memory 1038, first coil 1040, second coil 1042, and third coil 1044. First coil 1040, second coil 1042, and third coil 1044 form the magnetic field detector of the sensor system of base 1028.

Processor 1032 of base 1028 receives positioning signals via first coil 1040, second coil 1042, and third coil 1044 that are used to determine the position and orientation of a weapon used in the simulation system. In a preferred embodiment, each of the positioning signals received via first coil 1040, second coil 1042, and third coil 1044 can be differentiated from one another by one or more of each positioning signal's phase, frequency, amplitude, and duty cycle so that each positioning signal transmitted by each coil is distinct. The differences in the positioning signals allow base 1028 to determine the position of a transmitting device, such as removable plug 1016 of FIG. 10F, based on the positioning signals that indicates the relative position between base 1028 and the transmitting device.

Referring to FIG. 10F, removable plug 1016 is inserted into an under barrel of weapon 1010 and transmits positioning signals used to determine the location an orientation of removable plug 1016 and the weapon removable plug 1016 is connected to. Removable plug 1016 includes processor 1017, which is connected to battery 1018, communication interface 1046, first coil 1048, second coil 1050, and third coil 1052. First coil 1048, second coil 1050, and third coil 1052 form magnetic field transmitters of a sensor system of removable plug 1016. The magnetic fields generated and transmitted by first coil 1048, second coil 1050, and third coil 1052 are positioning signals used to determine the location and orientation of removable plug 1016, for example, by base 1028 of FIG. 10E.

Processor 1017 transmits positioning signals from first coil 1048, second coil 1050, and third coil 1052 that are received by processor 1032 of base 1028. From the transmitted positioning signals, the relative location and orientation between removable plug 1016 and base 1028 is determined so that the precise location of removable plug 1016 with respect to base 1028 is derived. The determinations and derivations may be performed by one or more of processor 1032 of base 1028, processor 1017 of removable plug 1016, and a processor of another computer of the simulation system, such as computer 1009. Once the position of removable plug 1016 is known, the position and orientation of weapon 1010 is determined based on the location and orientation of removable plug 1016, the geometry of removable plug 1016, the geometry of weapon 1016, and the placement of removable plug 1016 on weapon 1016. With the position and orientation of weapon 1010, the simulation application can display a simulated version of weapon 1016, calculate the proper position of a phantom target, and provide suggested adjustments to improve a user's marksmanship.

In an alternative embodiment, the sensor system of base 1028 includes the magnetic field transmitter and the sensor system of removable plug 1016 includes the magnetic field detector. In alternative embodiments, removable plug 1016 includes threading that corresponds to threading with the barrel of the weapon that is commonly used for a shotgun choke and removable plug 1016 is fitted and secured to the barrel of the weapon via the threading.

Figure 10G:
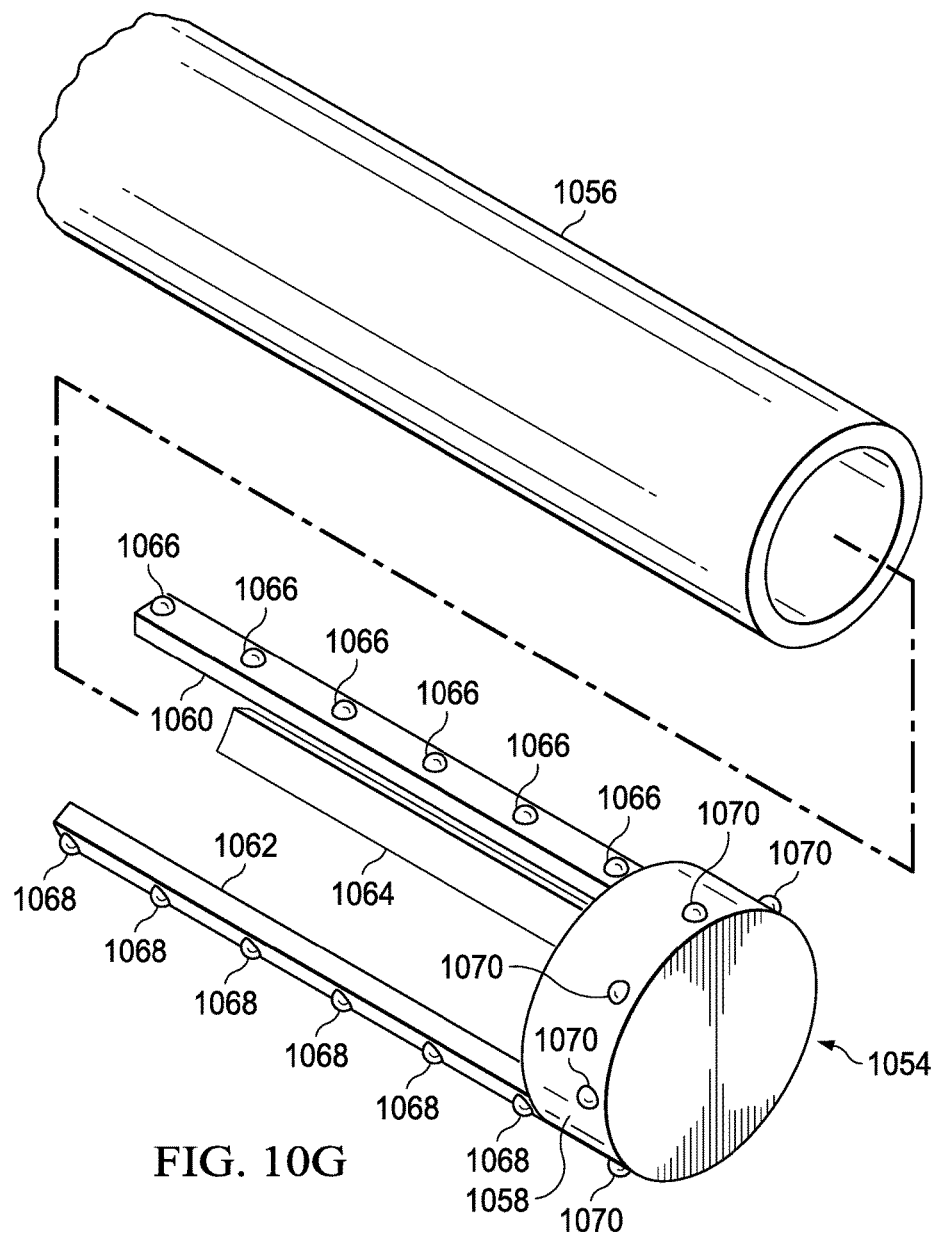
FIG. 10G is a detail view of a removable plug with light emitting diodes for a weapon of a preferred embodiment.

Referring to FIG. 10G, removable collar 1054 fits onto barrel 1056 of a weapon, such as weapon 1010 of FIG. 10B. Removable collar 1054 includes tip 1058 and three members 1060, 1062, and 1064. Members 1060, 1062, and 1064 extend from a first side of tip 1058 that touches barrel 1056 when removable collar 1054 is fitted to barrel 1056. Removable collar 1054 includes light emitting diodes (LEDs), such as LEDs 1066 on member 1060, LEDs 1068 on member 1062, and LEDs on member 1064, and LEDs 1070 on tip 1058. Removable collar 1054 includes additional LEDs that are occluded on FIG. 10G, such as on member 1064 and on tip 1058. The LEDs on removable collar 1054 may emit infrared light to be invisible to a user or may emit light in the visible spectrum. Removable collar 1054 acts as a marker from which the location and orientation of the weapon can be derived.

The LEDs on removable collar 1054 each emit light using particular transmission characteristics, such as phase, frequency, amplitude, and duty cycle. The differences in the phase, frequency, amplitude, and duty cycle of the light emitted by the LEDs allows for a sensor to identify each LED on removable collar 1054 by the LED's transmission characteristics. The LEDs on removable collar 1054 are spaced with placement characteristics so that there is a unique distance between any two LEDs, which gives the appearance of a slightly randomized placement on removable collar 1054. The transmission characteristics along with placement characteristics of the LEDs on removable collar 1054 allows the simulation system to determine the location and orientation of the removable plug by sensing as few as three LEDs with a camera or other sensor. Once the location and orientation of removable collar 1054 is determined, the location and orientation of the weapon to which removable collar 1054 is attached is derived based on the known geometries of removable collar 1054 and the weapon, which are stored in a database.

Figure 10H:
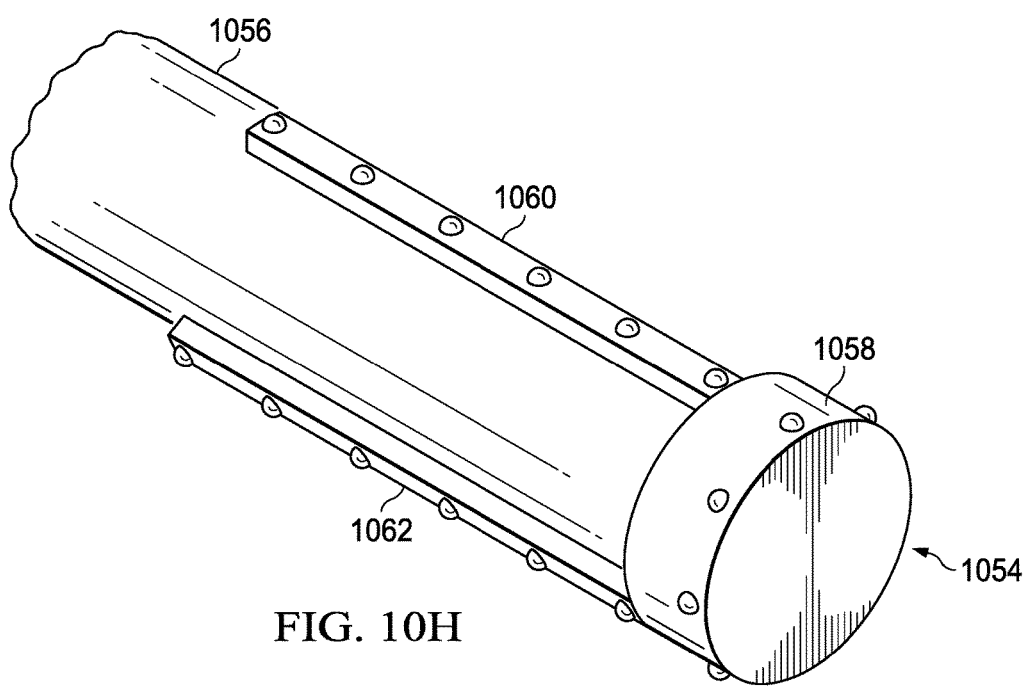
FIG. 10H is a detail view of a removable plug with light emitting diodes attached to a weapon of a preferred embodiment.

Referring to FIG. 10H, removable collar 1054 is fitted onto barrel 1056 of a weapon. Inner portions of members 1060-1064 are rubberized and may contain an adhesive to prevent movement of removable collar 1054 with respect to the weapon it is attached to. After removable collar 1054 is installed for the first time to a weapon, the simulation system is calibrated to associate the location and orientation, including a roll angle, of removable collar 1054 to the location and orientation of the weapon.

In alternative embodiments, the portion of removable collar 1054 that fits against the barrel of the weapon is shaped to fit with only one orientation with respect to the weapon. The removable collar 1054 may include additional members that fit around the iron sight of the weapon so that there is only one possible fitment of removable collar 1054 to the weapon and the process of calibration can be reduced or eliminated.

Figure 10I:
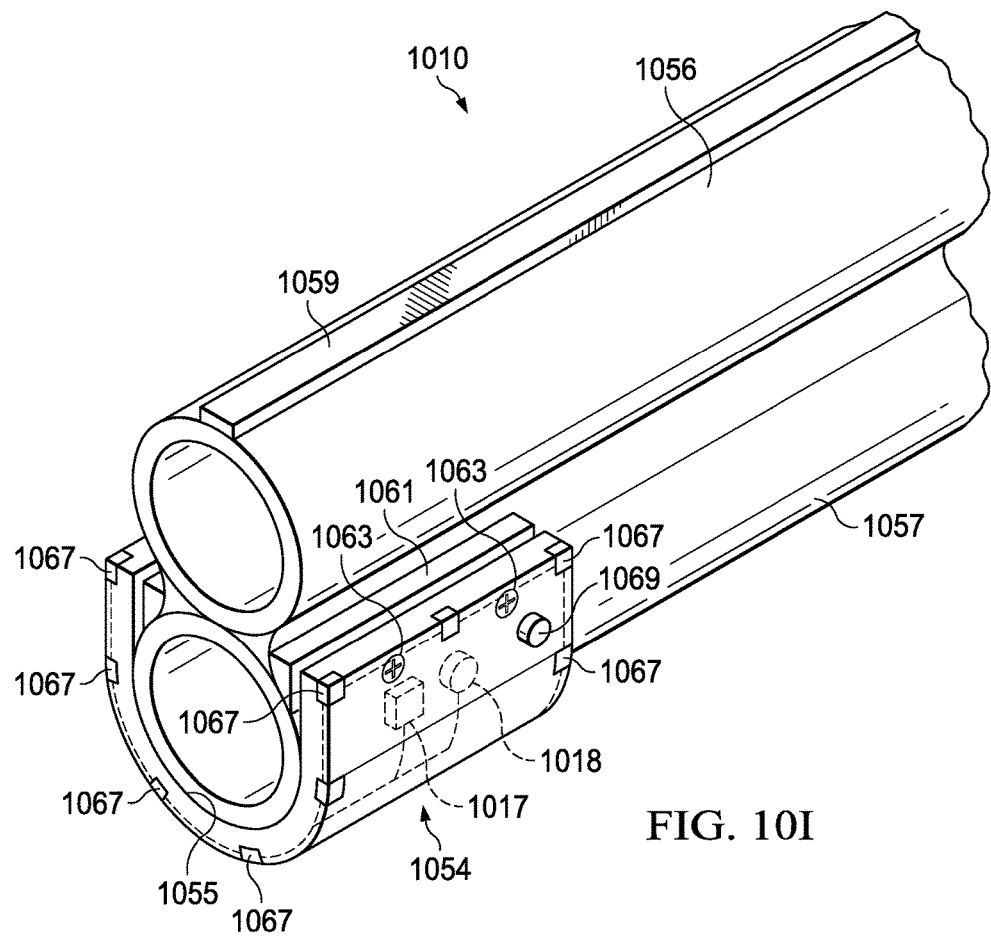
FIG. 10I is a detail view of a removable collar with light emitting diodes attached to a weapon of a preferred embodiment.

Referring to FIG. 10I, removable collar 1054 is fitted to weapon 1010. Weapon 1010 is an over-under shotgun with over barrel 1056, under barrel 1057, and top rail 1059. Removable collar 1054 comprises a hollow portion 1055 that allows for the discharge of live or blank rounds of ammunition during the simulation. A front surface of removable collar 1054 is flush with the front surfaces of barrel 1057 so that the position of removable collar 1054 with respect to each of barrels 1056 and 1057 is known and the trajectory of shots from weapon 1010 can be properly simulated. Removable collar 1054 includes hollow portion 1055, member 1061, mounting screws 1063, battery 1018, processor 1017, and LEDs 1067. Removable collar 1054 is customized to the particular shape of weapon 1010, which may include additional iron sights. Removable collar 1054 does not interfere with the sights of weapon 1010 so that weapon 1010 can be aimed normally while removable collar 1054 is fitted to weapon 1010.

Member 1061 is a flat elongated member that allows for removable collar 1054 to be precisely and tightly fitted to the end of barrel 1057 of weapon 1010 after removable collar 1054 is slid onto the end of barrel 1057. Member 1061 with screws 1063 operate similar to a C-clamp with screws 1063 pressing into member 1061 and thereby securing removable collar 1054 to the end of barrel 1057 with sufficient force so that the position and orientation of removable collar 1054 with respect to weapon 1010 is not altered by the firing of live rounds or blank rounds of ammunition with weapon 1010.

Battery 1018 is connected to and powers the electrical components within removable collar 1054 including processor 1017 and LEDs 1067. Processor 1017 controls LEDs 1067. In additional embodiments removable collar 1054 includes one or more, accelerometers, gyroscopes, compasses, and communication interfaces connected to processor 1017. The sensor data from the accelerometers, gyroscopes, and compasses is sent from removable collar 1054 to computer 1009 via the communication interface. Removable collar 1054 includes button 1069 to turn on, turn off, and initiate the pairing of removable collar 1054.

LEDs 1067 emit light that is sensed by one or more cameras or sensors, from which the locations and orientations of removable collar 1054 and weapon 1010 can be determined. The locations and orientations are determined from the transmission characteristics of the light emitted from LEDs 1067, and the placement characteristics of LEDs 1067.

Weapon 1010, to which removable collar 1054 is fitted, is loaded with one or more live or blank rounds of ammunition that discharge through the hollow portion 1055 of removable collar 1054 when a trigger of weapon 1010 is pulled so that blank rounds or live rounds of ammunition can be used in conjunction with the simulation. Using blank rounds or live rounds with the simulation allows for a more accurate and realistic simulation of the shooting experience, including the experience of re-aiming weapon 1010 for a second shot after feeling the kickback from the discharge of a blank or live round from a first shot.

In alternative embodiments, the weapon is a multiple shot weapon, such as an automatic rifle, a semi-automatic shotgun, or a revolver. With a multiple shot weapon the simulation experience includes the feeling of the transition between shots, such as the cycling of the receiver of a semi-automatic shotgun. When the weapon comprises an automatic or semi-automatic receiver, the simulation displays the ejection of a spent shell casing that may not correspond to the actual path or trajectory of the actual spent shell casing. Additional embodiments track the location of the spent shell casing as it is ejected and match the location and trajectory of the simulated shell casing to the location and trajectory of the spent shell casing. Additional embodiments also include one or more additional sensors, electronics, and power supplies embedded within the housing of removable collar 1054.

Referring to FIG. 10J, weapon 1072 is adapted for use in a simulation by the fitment of removable collar 1054 to the barrel of weapon 1072. Weapon 1072 is a try gun that includes a stock 1074 with adjustable components to fit users of different heights and statures. Each component may include electronic sensors that measure the length, angle, or position of the component so that weapon 1072 can be properly displayed in a simulation.

Stock 1074 of weapon 1072 includes comb 1076 with comb angle adjuster 1078 and comb height adjuster 1080. Comb 1076 rests against a cheek of a user to improve stability of weapon 1072 during use. The height of comb 1076 is adjustable via manipulation of comb height adjuster 1080. The angle of comb 1076 is adjustable via manipulation of comb angle adjuster 1078.

Stock 1074 of weapon 1072 also includes butt plate 1082 with butt plate angle adjuster 1084 and trigger length adjuster 1086. Trigger length 1088 is the length from trigger 1090 to butt plate 1082. Butt plate 1082 rests against a shoulder of a user to improve stability of weapon 1072 during use. Trigger length 1088 from butt plate 1082 to trigger 1090 is adjustable via manipulation of trigger length adjuster 1086. The angle of butt plate 1082 is adjustable via manipulation of butt plate angle adjuster 1084.

When weapon 1072 used in a virtual reality simulation system with removable collar 1054, suggested adjustments to comb 1076 and butt plate 1082 are optionally provided. If shots are consistently to the right or left of an ideal shot placement for a right handed shooter, it may be suggested to increase or decrease trigger length 1088, respectively. If shots are consistently above or below the ideal shot placement, it may be suggested to decrease or increase the height of comb 1076, respectively.

Figure 10K:
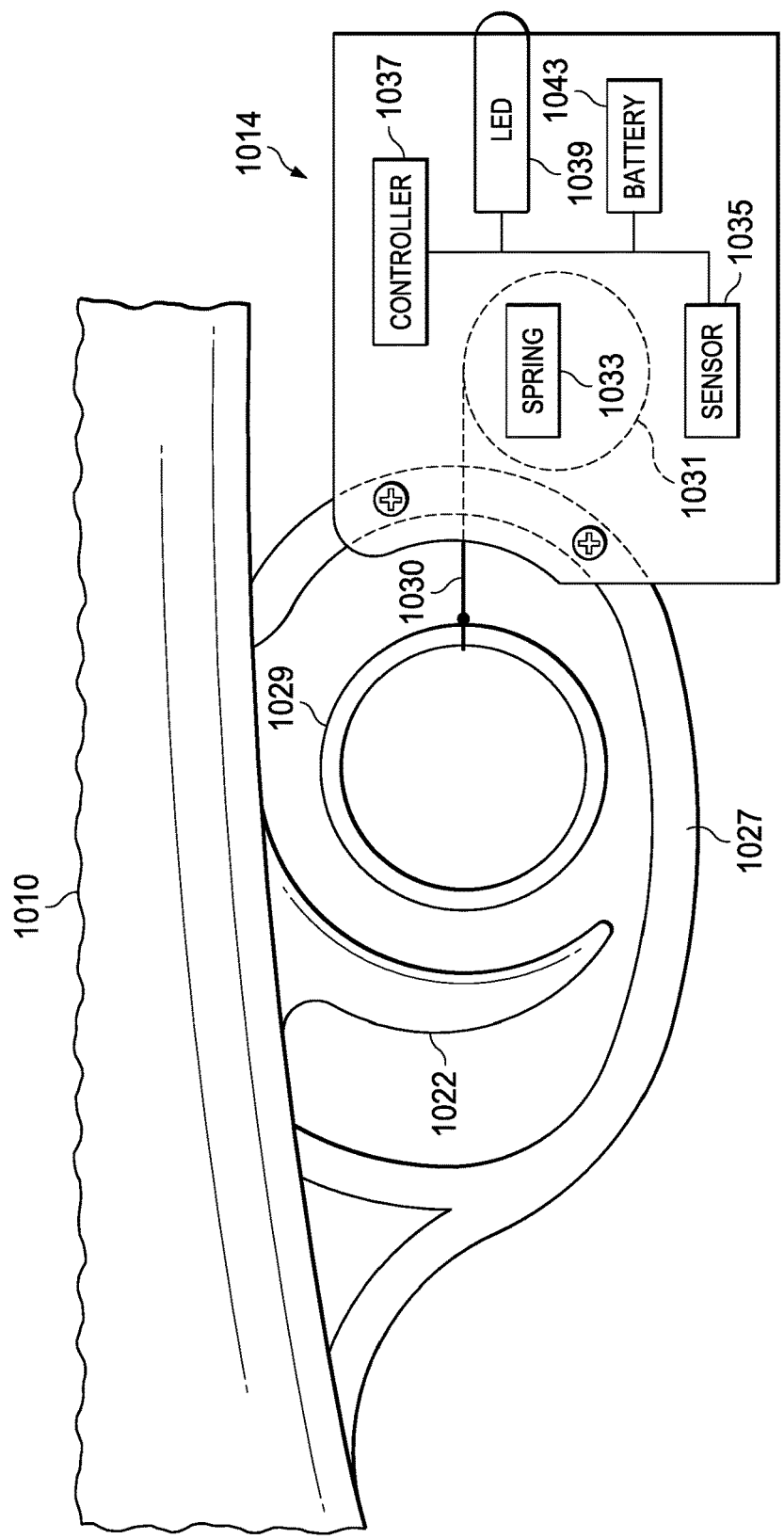
FIG. 10K is a detail view of a trigger sensor of a preferred embodiment.

Referring to FIG. 10K, an alternative embodiment of trigger sensor 1014 is shown. Weapon 1010 includes trigger 1022 and trigger guard 1027. Trigger sensor 1014 is specially shaped and contoured to fit securely to the front of trigger guard 1027. Once trigger sensor 1014 is slid onto trigger guard 1027, screws 1041 are tightened to further secure trigger sensor 1014 to trigger guard 1027 and weapon 1010.

Pull ring 1029 is connected to string 1030, which winds upon spindle 1031. Spindle 1031 includes spring 1033, which keeps tension on string 1030 and biases pull ring 1029 to be pulled away from trigger 1022 and towards trigger guard 1027 and trigger sensor 1014. In the resting state, there is no slack in string 1030 and pull ring 1029 rests against trigger sensor 1014.

Sensor 1035 provides data indicative of the rotation and/or position of spindle 1031. In one preferred embodiment, sensor 1035 is a potentiometer that is connected to and turns with spindle 1031, where a voltage of the potentiometer indicates the position of spindle 1031 and a change in voltage indicates a rotation of spindle 1031. In another preferred embodiment, sensor 1035 includes one or more photo emitters and photo detectors that surround an optical encoder wheel that is attached to spindle 1031, where light from the photo emitters passes through the encoder wheel to activate certain photo detectors to indicate the position of spindle 1031.

Controller 1037 receives data from sensor 1035 to determine the state of trigger sensor 1014 and communicates the state of trigger sensor 1014 by controlling the output of LED 1039 to create a coded signal that corresponds to the state of trigger sensor 1014. In a preferred embodiment, the states of trigger sensor 1014 include: pull ring not engaged, pull ring engaged but trigger not pulled, pull ring engaged and trigger is pulled. Controller 1037, LED 1039, and sensor 1035 are powered by battery 1043.

The state of trigger sensor 1014 is communicated by controlling the output LED 1039 with controller 1037. The output of LED 1039 forms a coded signal to indicate the state of trigger sensor 1014 and can also be used to aid in the determination of the position and orientation of weapon 1010 when the position of trigger sensor 1014 with respect to weapon 1010 and the geometry of weapon 1010 are known. The output of LED 1039 is cycled on and off to flash with a particular phase, frequency, amplitude, and duty cycle that form a set of output characteristics. Different output characteristics are used to indicate different states of trigger sensor 1014. A first set of output characteristics or first code is used to indicate the pull ring not engaged state, a second set of output characteristics or second code is used to indicate the pull ring engaged but trigger not pulled state, and a third set of output characteristics or third code is used to indicate the pull ring engaged and trigger is pulled state. In one embodiment, the pull ring not engaged state is indicated by a set of output characteristics where the duty cycle is 0% and/or the amplitude is 0 so that LED 1039 does not turn on. An external sensor or camera, such as one of position trackers 1205, 1206, and 1215 can be used to determine the state of trigger sensor 1014 by detecting the output from LED 1039 and decoding the output characteristics to determine which state trigger sensor 1014 is in.

In an alternative embodiment, pull ring 1029 and string 1030 each include conductive material, trigger sensor 1014 includes a pull-up resistor connected to an input of controller 1037, and controller 1037 is electrically grounded to trigger guard 1027. When trigger 1022 and trigger guard 1027 are electrically connected and conductive pull ring 1029 is touched to trigger 1022, the pull-up resister is grounded to change the state of the input of controller 1037 so that controller 1037 can determine whether pull ring 1029 is touching trigger 1022. Assuming that the user only touches pull ring 1029 to trigger 1022 when attempting to pull trigger 1022, the determination of whether pull ring 1029 is touching trigger 1022 can be used to indicate that the trigger has been pulled, which is communicated by changing the output coding of LED 1039.

Figure 11A:
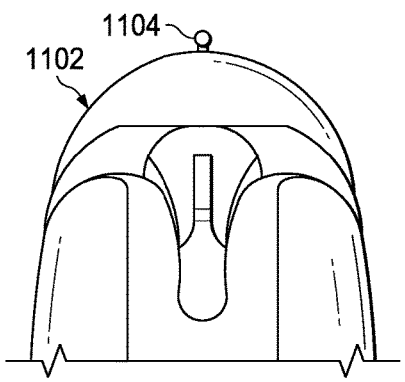
FIG. 11A is a simulation view of a weapon having an iron sight of a preferred embodiment.
Figure 11B:
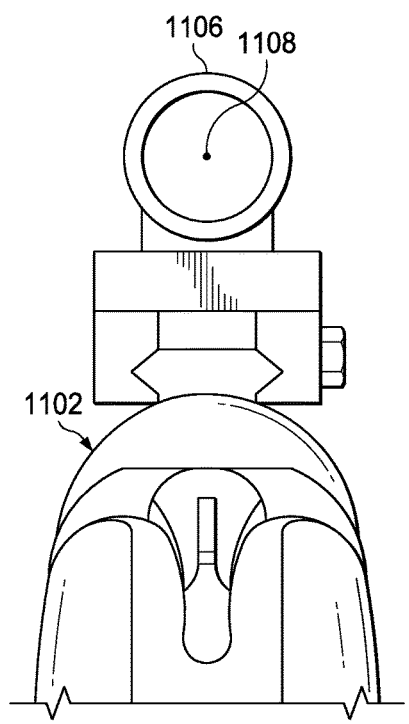
FIG. 11B is a simulation view of a weapon having a reflex sight of a preferred embodiment.
Figure 11C:
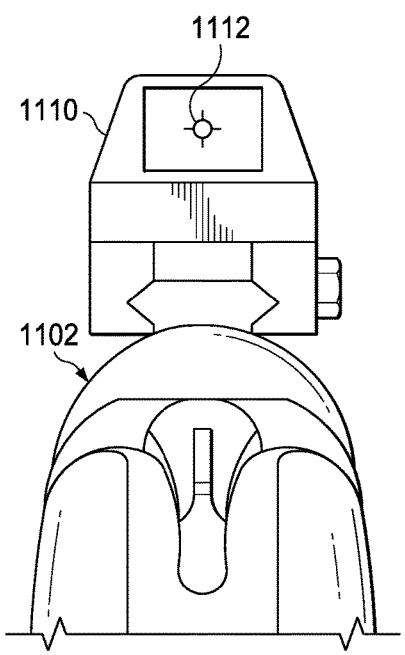
FIG. 11C is a simulation view of a weapon having a holographic sight of a preferred embodiment.

Referring to FIGS. 11A, 11B, and 11C, different types and styles of sights may be used on weapons used with the simulation. Additionally, the simulation may display a sight on a weapon that is different from the sight actually on the weapon to allow different types of sights to be tested. In alternative embodiments, the halo around the phantom target can be adjusted to match or include the sight profile of the sight being used on the weapon.

In FIG. 11A, weapon 1102 includes iron sight 1104. Iron sight 1104 comprises two components, one proximate to the tip of the barrel of weapon 1102 and one distal to the tip of weapon 1102, that when aligned indicate the orientation of weapon 1102 to a user of weapon 1102.

In FIG. 11B, weapon 1102 includes reflex sight 1106, also referred to as a red-dot sight, which may be in addition to an iron sight on weapon 1102. Reflex sight 1106 is mounted on the barrel of weapon 1102 and includes sight profile 1108 shown as a dot. Sight profile 1108 may take any size, shape, color, or geometry and may include additional dots, lines, curves, and shapes of one or more colors. A user can only see the sight profile 1108 when the head of the user is properly positioned with respect to reflex sight 1106.

In FIG. 11C, weapon 1102 includes holographic sight 1110, which may be in addition to an iron sight. Holographic sight 1110 is mounted to the receiver of weapon 1102 and includes sight profile 1112 shown as a combination circle with dashes. Sight profile 1112 may take any size, shape, color, or geometry and may include additional dots, lines, curves, and shapes of one or more colors. A user can only see the sight profile 1112 when the head of the user is properly positioned with respect to holographic sight 1110.

Figure 12:
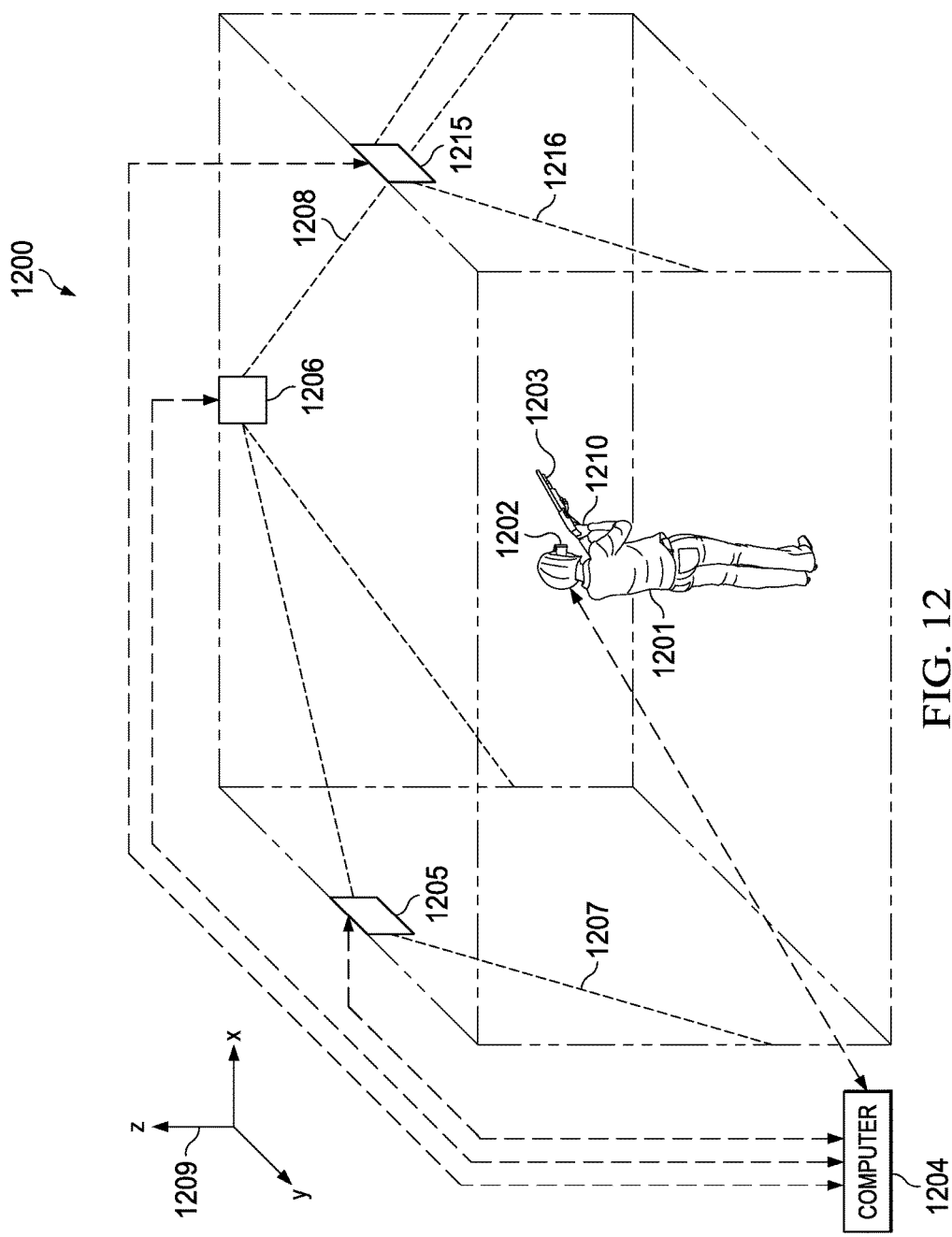
FIG. 12 is a schematic view of a virtual reality simulation environment of a preferred embodiment.

Referring to FIG. 12, in simulation environment 1200, user 1201 wears user device 1202 connected to computer 1204 and holds weapon 1203. Each of position trackers 1205, 1206, and 1215 is connected to computer 1204. Position tracker 1205 has field of view 1207. Position tracker 1206 has field of view 1208. Position tracker 1215 has field of view 1216. User 1201 is positioned in fields of view 1207, 1208, and 1216.

In one embodiment, weapon 1203 is a simulated weapon. In another embodiment, weapon 1203 is a real weapon with a simulation attachment. In another embodiment, weapon 1203 is a real weapon and user 1201 wears a set of tracking gloves 1210. In other embodiments, user 1201 wears the set of tracking gloves 1210 and uses the simulated weapon or the real weapon with the simulation attachment.

In a preferred embodiment, each of position trackers 1205, 1206, and 1215 is a near infrared CMOS sensor having a refresh rate of 60 Hz. Other suitable position trackers known in the art may be employed. For example, position trackers 1205, 1206, and 1215 can be embodiments of base 1028 of FIG. 10E.

In a preferred embodiment, position trackers 1205, 1206, and 1215 capture the vertical and horizontal positions of user device 1202, weapon 1203 and/or set of gloves 1210. For example, position tracker 1205 captures the positions and movement of user device 1202 and weapon 1203, and/or set of gloves 1210 in the y-z plane of coordinate system 1209 and position tracker 1206 captures the positions and movement of user device 1202 and weapon 1203 and/or set of gloves 1210 in the x-z plane of coordinate system 1209. Further, a horizontal angle and an inclination angle of the weapon are tracked by analyzing image data from position trackers 1205, 1206, and 1215. Since the horizontal angle and the inclination angle are sufficient to describe the aim point of the weapon, the aim point of the weapon is tracked in time.

In a preferred embodiment, computer 1204 generates the set of target data includes a target launch position, a target launch angle, and a target launch velocity of the generated target. Computer 1204 retrieves a set of weapon data based on a desired weapon, including a weapon type e.g., a shotgun, a rifle, or a handgun, a set of weapon dimensions, a weapon caliber or gauge, a shot type including a load, a caliber, a pellet size, and shot mass, a barrel length, a choke type, and a muzzle velocity. Other weapon data may be employed. Computer 1204 further retrieves a set of environmental data that includes temperature, amount of daylight, amount of clouds, altitude, wind velocity, wind direction, precipitation type, precipitation amount, humidity, and barometric pressure for desired environmental conditions. Other types of environmental data may be employed.

Position trackers 1205, 1206, and 1215 capture a set of position image data of user device 1202, weapon 1203 and/or set of gloves 1210 and the set of images is sent to computer 1204. Sensors in user device 1202, weapon 1203 and/or set of gloves 1210 detect a set of orientation data and sends the set of orientation data to computer 1204. Computer 1204 then calculates a generated target flight path for the generated target based on the set of target data, the set of environment data, and the position and orientation of the user device 1202. The position and orientation of the user device 1202, the weapon 1203 and/or set of gloves 1210 are determined from the set of position image data and the set of orientation data. Computer 1204 generates a phantom target and a phantom halo based on the generated target flight path and transmits the phantom target and the phantom halo to user device 1202 for viewing by user 1201. User 1201 aims weapon 1203 at the phantom target and the phantom halo to attempt to hit the generated target. Computer 1204 detects a trigger pull on weapon 1203 by a trigger sensor and/or a finger sensor and determines a hit or a miss of the generated target based on the timing of the trigger pull, the set of weapon data, the position and orientation of user device 1202, weapon 1203, and/or set of gloves 1210, the phantom target, and the phantom halo.

In an alternative embodiment, the set of gloves is replaced by a thimble worn on the trigger finger of the shooter and a simulation attachment on the weapon. The simulation attachment on the weapon indicates the position and direction of the weapon and the trigger finger thimble is used to indicate when the trigger is pulled. The positions of the simulation attachment and the thimble are tracked by position trackers 1205, 1206, and 1215. When the user provides a "pull" command, such as by vocalizing the word "pull" that is picked up via voice recognition, the system launches a target and arms the trigger finger thimble, so that when sufficient movement of the thimble relative to the weapon is detected, the system will identify the trigger as being pulled and fire the weapon in the simulation. When the thimble is not armed, movement of the thimble with respect to the weapon is not used to identify if the trigger has been pulled.

When weapon 1203 is loaded with live or blank rounds of ammunition, the discharge of the live or blank rounds of ammunition are detected by one or more sensors, such as a microphone, of user device 1202. When the discharge of a live or blank round of ammunition is detected and weapon 1203 is a multi-shot weapon that includes a receiver that cycles between shots, the simulation displays the cycling of the receiver after the discharge of the live or blank round of ammunition is detected. When weapon 1203 is a revolver, the simulation displays the rotation of the cylinder. When the system detects the discharge of a number of rounds of live or blank ammunition that is equal to the maximum number of rounds that can be stored in weapon 1203, the system provides an indication to the user, via user device 1202, that it is time to reload weapon 1203.

Figure 13:
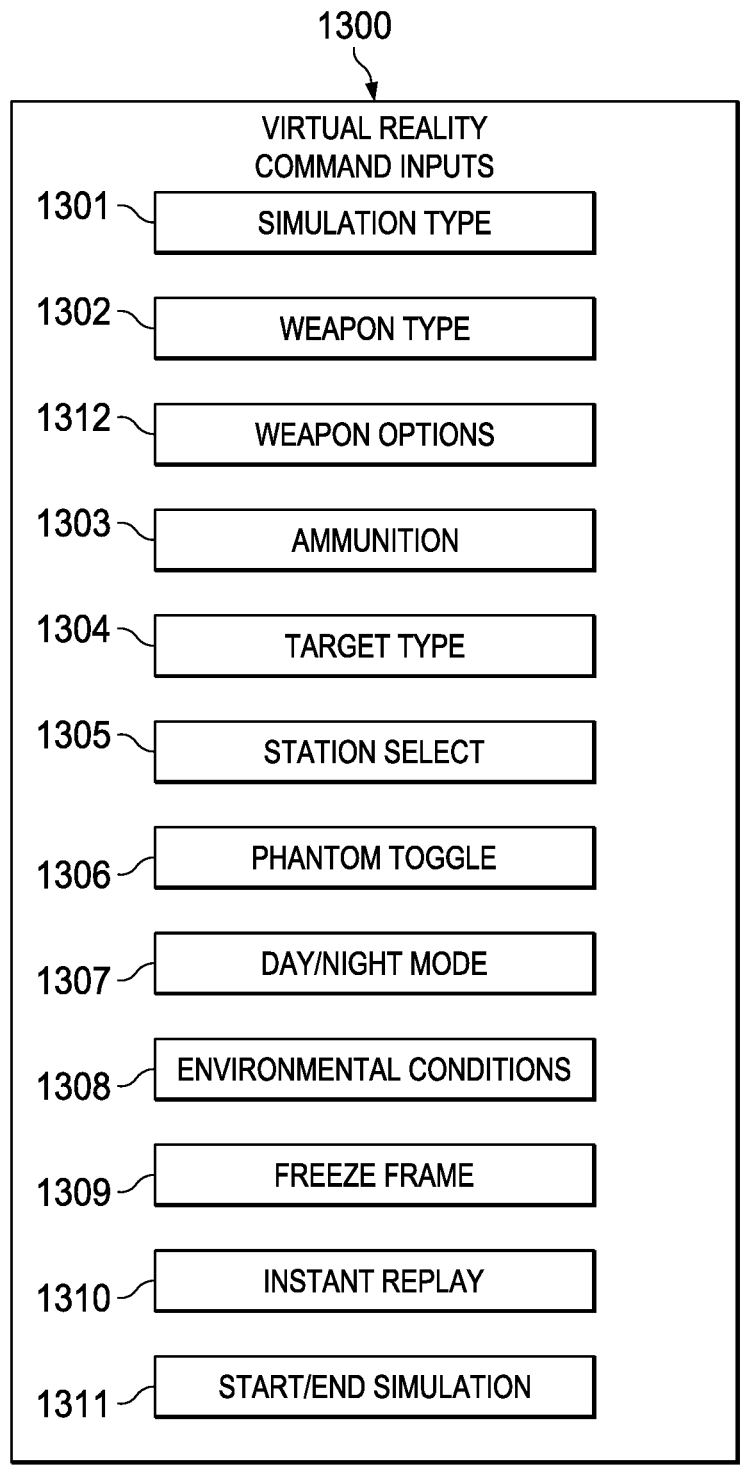
FIG. 13 is a command input menu for a virtual reality simulator system of a preferred embodiment.

Referring to FIG. 13, command menu 1300 includes simulation type 1301, weapon type 1302, weapon options 1312, ammunition 1303, target type 1304, station select 1305, phantom toggle 1306, day/night mode 1307, environmental conditions 1308, freeze frame 1309, instant replay 1310, and start/end simulation 1311. Simulation type 1301 enables a user to select different types of simulations. For example, the simulation type includes skeet shooting, trap shooting, sporting clays, and hunting. Weapon type 1302 enables the user to choose from different weapon types and sizes. Weapon types include shot guns, rifles, handguns, airsoft weapons, air guns, and so on. Weapon sizes include the different calibers or gauges for the weapon's type. The user further enters a weapon sensor location, for example, in the muzzle or on a rail, and whether the user is right or left handed. Weapon options 1312 enables the user to select different weapon options relating the weapon selected via weapon type 1302. Weapon options 1312 include optional accessories that can be mounted to the weapon, such as tactical lights, laser aiming modules, forward hand grips, telescopic sights, reflex sights, red-dot sights, iron sights, holographic sights, bipods, bayonets, and so on, including iron sight 1104, reflex sight 1106, and holographic sight 1110 of FIG. 11. Weapon options 1312 also include one or more beams to be simulated with the weapon, such as beams 1906, 1912, 1916, 1920, 1924, 1928, 1932, and 1936 of FIG. 19, which show an approximated trajectory of a shot and are optionally adjusted for one or more of windage and gravity. Ammunition 1303 enables the user to select different types of ammunition for the selected weapon type. Target type 1304 enables the user to select different types of targets for the simulation, including clay targets, birds, rabbits, and so on. Each type of target includes a target size, a target color, and a target shape. Station select 1305 enables the user to choose different stations to shoot from, for example, in a trap shooting range, a skeet shooting range, a sporting clays course, or a field. The user further selects a number of shot sequences for the station select. In a preferred embodiment, the number of shot sequences in the set of shot sequences is determined by the type of shooting range used and the number of target flight path variations to be generated. For example, the representative number of shot sequences for a skeet shooting range is at least eight, one shot sequence per station. More than one shot per station may be utilized.

In a preferred embodiment, each simulation type 1301 is associated with one or more animated virtual reality shooting scenarios. As one example, when simulation type 1301 is hunting, the animated virtual reality shooting scenario includes a scenario for learning how to shoot over dogs. The shooting over dogs scenario displays an animated dog going on point as a part of the hunt in the simulation so that the user can learn to shoot the target and avoid shooting the dog.

Phantom toggle 1306 allows a user to select whether to display a phantom target and a phantom halo during the simulation. The user further selects a phantom color, a phantom brightness level, and a phantom transparency level.

In certain embodiments, phantom toggle 1306 includes additional help options that adjust the amount of "help" given to the user based on how well the user is doing, such as with aim sensitive help and with dynamic help. When aim sensitive help is selected, aim sensitive help is provided that adjusts one or more of the transparency, color, and size of one or more beams from weapon options 1312, phantom targets, and halos based on how close the aim point of the weapon is to a phantom target. With aim sensitive help, the beams, phantom targets, and halos are displayed with less transparency, brighter colors, and larger sizes the further off-target the aim point of the weapon is. Conversely, the beams, phantom targets, and halos are displayed with more transparency, darker colors, and smaller sizes when the weapon is closer to being aimed on-target.

When dynamic help is selected, the amount of help provided to the user for each shot is adjusted dynamically based on how well the user is performing with respect to one or more of each shot, each round, and the simulation overall. When more help is provided, beams, phantom targets, and halos are given more conspicuous characteristics and, conversely, when less help is provided, the beams, phantom targets, and halos are shown more passively or not at all. The amount of help is dynamic in that when the previous one or more shots hit the target, a lesser amount of help is provided on the next one or more shots and, conversely, when the previous one or more shots did not hit the target, more help is provided for the subsequent one or more shots. As the user's skill level advances, the brightness of the phantom target can diminish until it is transparent—the user has learned correct lead by rote repetition and no longer needs the phantom as a visual aide.

Day/night mode 1307 enables the user to switch the environment between daytime and nighttime. Environmental conditions 1308 enables the user to select different simulation environmental conditions including temperature, amount of daylight, amount of clouds, altitude, wind velocity, wind direction, precipitation type, precipitation amount, humidity, and barometric pressure. Other types of environmental data may be employed. Freeze frame 1309 allows the user to "pause" the simulation. Instant replay 1310 enables the user replay the last shot sequence including the shot attempt by the user. Start/end simulation 1311 enables the user to start or end the simulation. In one embodiment, selection of 1301, 1302, 1312, 1303, 1304, 1305, 1306, 1307, 1308, 1309, 1310, and 1311 is accomplished via voice controls. In another embodiment, selection of 1301, 1302, 1312, 1303, 1304, 1305, 1306, 1307, 1308, 1309, 1310, and 1311 is accomplished via a set of controls on a simulated weapon as previously described.

Figure 14:
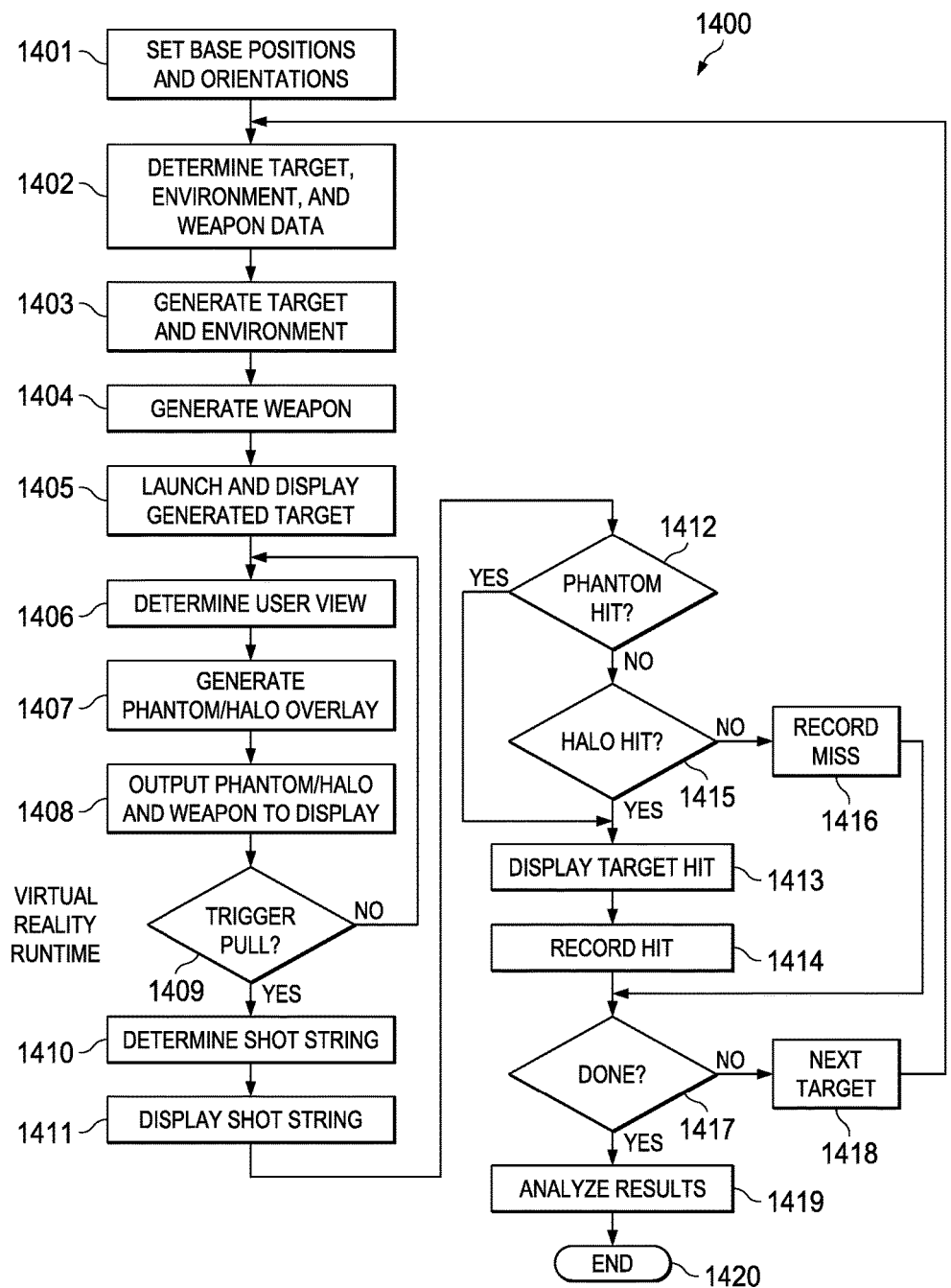
FIG. 14 is a flow chart of a method for runtime process of a virtual reality simulation system of a preferred embodiment.

Referring to FIG. 14, runtime method 1400 for a target simulation will be described. At step 1401, a baseline position and orientation of the user device and a baseline position and orientation of the weapon are set. In this step, the computer retrieves a set of position image data from a set of position trackers, a set of orientation data from a set of sensors in the user device, the weapon and/or a set of gloves and saves the current position and orientation of the user device and the weapon into memory. Based on the simulation choice, the virtual position of the launcher relative to the position and orientation of the user device is also set. If the user device is oriented toward the virtual location of the launcher, a virtual image of the launcher will be displayed. At step 1402, a set of target flight data, a set of environment data, and a set of weapon data are determined from a set of environment sensors and a database.

In a preferred embodiment, the set of weapon data is downloaded and saved into the database based on the type of weapon that is in use and the weapon options selected to be used with the weapon. In a preferred embodiment, the set of weapon data includes a weapon type e.g., a shotgun, a rifle, or a handgun, a weapon caliber or gauge, a shot type including a load, a caliber, a pellet size, and shot mass, a barrel length, a choke type, and a muzzle velocity. Other weapon data may be employed. In a preferred embodiment, the weapon options include one or more accessories and beams, including iron sight 1104, reflex sight 1106, and holographic sight 1110 of FIG. 11, and including beams 1906, 1912, 1916, 1920, 1924, 1928, 1932, and 1936 of FIG. 19.

In a preferred embodiment, the set of environment data is retrieved from the database and includes a wind velocity, an air temperature, an altitude, a relative air humidity, and an outdoor illuminance. Other types of environmental data may be employed.

In a preferred embodiment, the set of target flight data is retrieved from the database based on the type of target in use. In a preferred embodiment, the set of target flight data includes a launch angle of the target, an initial velocity of the target, a mass of the target, a target flight time, a drag force, a lift force, a shape of the target, a color of the target, and a target brightness level. In alternative embodiments, the target is a self-propelled flying object, such as a bird or drone, which traverses the simulated environment at a constant air speed.

At step 1403, the target and environment are generated from the set of target flight data and the set of environmental data. At step 1404, a virtual weapon image that includes the selected weapon options is generated and saved in memory. In this step, images and the set of weapon data of the selected weapon and the selected weapon options for the simulation is retrieved from the database. At step 1405, the target is launched and the target and environment are displayed in the user device. In a preferred embodiment, a marksman will initiate the launch with a voice command such as "pull."

At step 1406, a view of the user device with respect to a virtual target launched is determined, as will be further described below.

At step 1407, a phantom target and a phantom halo are generated based on a target path and the position and orientation of the user, as will be further described below. The target path is determined from the target position the target velocity using Eqs. 1-4. At step 1408, the generated phantom target and the generated phantom halo are sent to the user device and displayed, if the user device is oriented toward the target path. The generated weapon is displayed with the selected weapon options if the user device is oriented toward the position of the virtual weapon or the selected weapon options.

At step 1409, whether the trigger on the weapon has been pulled is determined from a set of weapon sensors and/or a set of glove sensors. In one preferred embodiment with the trigger sensor of FIG. 10K, the determination of whether the trigger is pulled is made responsive to detecting one of the codes that correspond to the state of trigger sensor 1014 from the output of LED 1039 by a sensor, such as one of position trackers 1205, 1206, and 1215 of FIG. 12.

If the trigger has not been pulled, then method 1400 returns to step 1405. If the trigger has been pulled, then method 1400 proceeds to step 1410.

At step 1410, a shot string is determined. In this step, a set of position trackers capture a set of weapon position images. In this step, a set of weapon position data is received from a set of weapon sensors. The shot string is calculated by:

$$A_{shot\ string} = \pi R_{string}^2 \qquad \text{Eq. 7}$$

$$R_{string} = R_{initial} + v_{spread} t \qquad \text{Eq. 8}$$

where $A_{shot\ string}$ is the area of the shot string, $R_{string}$ is the radius of the shot string, $R_{initial}$ is the radius of the shot as it leaves the weapon, $v_{spread}$ is the rate at which the shot spreads, and t is the time it takes for the shot to travel from the weapon to the target. An aim point of the weapon is determined from the set of weapon position images and the set of weapon position data. A shot string position is determined from the position of the weapon at the time of firing and the area of the shot string.

At step 1411, if the user device is oriented along the muzzle of the weapon, the shot string is displayed on the user device at the shot string position. Separately, a gunshot sound is played and weapon action is displayed. Weapon action is based on the type of the weapon and includes the display of mechanical movements of the weapon, such as the movement of a semi-automatic receiver and the strike of a hammer of the weapon.

At step 1412, whether the phantom target has been "hit" is determined. The simulation system determines the position of the shot string, as previously described. The simulation system compares the position of the shot string to the position of the phantom target. The shot string is optionally displayed as an elongated cloud of any color that moves from the tip of the user device towards the shot location, which, ideally, is the target and provides visual feedback to the user of the path taken by the shot string. When the elongated cloud is close to the user device shortly after firing, the diameter of the elongated cloud is about one inch. When the elongated cloud is close to the target, about twenty five yards away from the user, the diameter of the cloud has expanded linearly to about twenty five inches.

If the position of the shot string overlaps the position of the phantom target, then the phantom target is "hit." If the position of the shot string does not overlap the phantom target, then the phantom target is "missed."

If the phantom target is hit and the user device is oriented toward the hit location, then method 1400 displays an animation of the target being destroyed on the user device at the appropriate coordinates and plays a sound of the target being destroyed at step 1413. At step 1414, the simulation system records a "hit" in the database.

If a "miss" is determined at step 1412, then method 1400 proceeds to step 1415. At step 1415, whether the phantom halo is hit is determined. In this step, whether the shot string overlaps an area of the phantom halo by a percentage greater than or equal to a predetermined percentage is determined. For example, the predetermined percentage is 50%. Whether the shot string overlaps at least 50% of the area of the phantom halo is determined. Any predetermined percentage may be employed.

If the position of the shot string overlaps the phantom halo by a percentage greater than or equal to the predetermined percentage, then a "hit" is determined and method 1400 proceeds to step 1413.

If at step 1415, the shot string does not overlap the area of the phantom halo by a percentage greater than or equal to the predetermined percentage, then a "miss" is determined and the simulation system records a "miss" in the database at step 1416.

The number of targets that are hit, the number of targets that are missed, the location of each shot with respect to the phantom target, and the location of the shot string with respect to the trajectory of the target are generated to form tracking data. The tracking data is analyzed to provide insights and suggested adjustments for how to improve the user's performance with the simulation system.

At step 1417, whether an end command has been received to complete the simulation is determined. If not received, then method 1400 advances to the next target at step 1418.

If an end command has been received and the simulation is complete, then a trend of shot attempts is analyzed at step 1419 by retrieving a number of "hits" in the set of shot sequences and a number of "misses" in the set of shot sequences from the database. In this step, a shot improvement is determined by evaluating the number of hits in the set of shot sequences and the number of misses in the set of shot sequences. Method 1400 ends at step 1420.

Figure 15A:
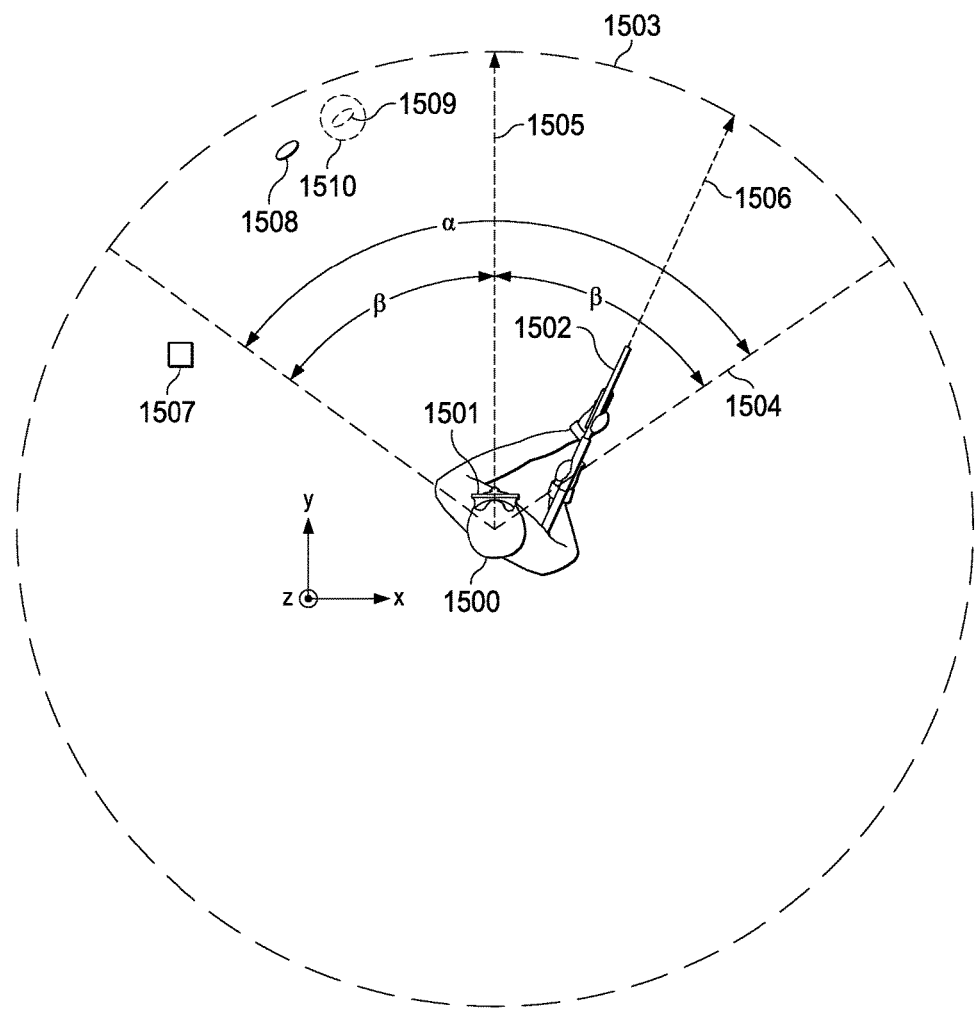
FIG. 15A is top view of a user and a simulation environment of a preferred embodiment.

Referring to FIG. 15A, user 1500 wears user device 1501 and holds weapon 1502 in simulation environment 1503. Simulation environment 1503 is a virtual sphere spanning 360° in all directions surrounding user 1500. User device 1501 has field of view 1504. Field of view 1504 is a cone that has angular range α and spans an arcuate portion (in two dimensions) or a sectorial portion (in three dimensions) of simulation environment 1503. User device orientation vector 1505 bisects field of view 1504 and angular range α into equal angles β Weapon 1502 has weapon orientation vector 1506. Each of user device orientation vector 1505 and weapon orientation vector 1506 is independent of each other. The positions of user device 1501, weapon 1502, user device orientation vector 1505, and weapon orientation vector have Cartesian x,y,z coordinates. Simulation environment 1503 has spherical coordinates. Simulation environment 1503 includes virtual target launcher 1507, virtual target 1508, phantom target 1509 and phantom halo 1510. As can be seen, weapon 1502, virtual target 1508, phantom target 1509, and phantom halo 1510 are in field of view 1504 of user device 1501. Virtual target launcher 1507 is not in field of view 1504 of user device 1501. Weapon 1502, virtual target 1508, phantom target 1509 and phantom halo 1510 will be displayed in user device 1501 and virtual launcher 1507 will not be displayed in user device 1501.

In a preferred embodiment, angular range α is approximately 110° and each of equal angles β is approximately 55°. Other angular ranges may be employed.

Figure 15B:
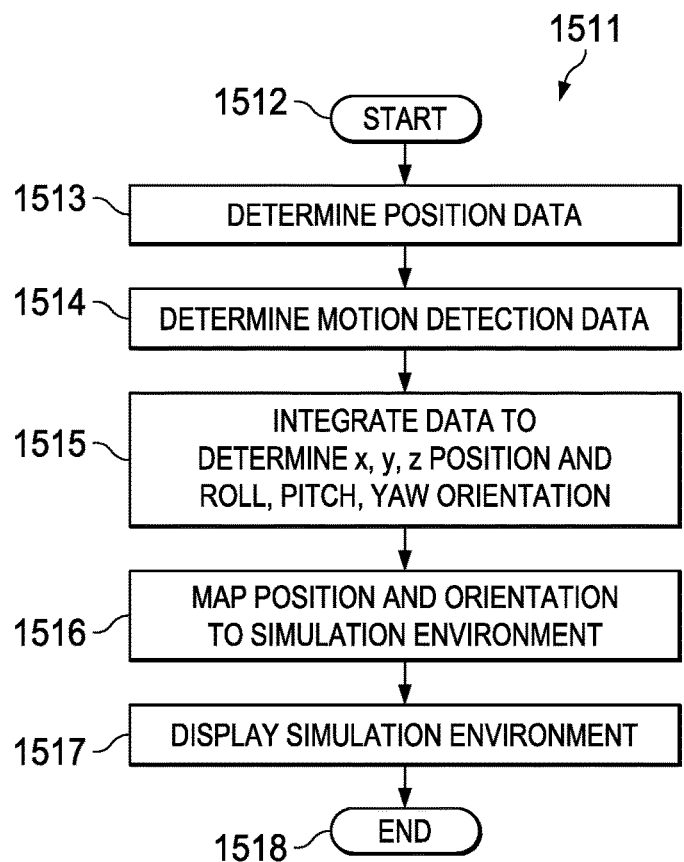
FIG. 15B is a flow chart of a method for determining a view for a user device with respect to a position and an orientation of the user device and the weapon.

Referring to FIG. 15B, step 1406 will be further described as method 1511 for determining a view for a user device with respect to a position and an orientation of the user device and the weapon. Method 1511 begins at step 1512. At step 1513, a set of current position image data is retrieved from a set of position trackers and a set of current position and orientation data is retrieved from the user device and the weapon and/or set of gloves. At step 1514, a set of motion detection data is received from a set of sensors in the user device to determine movement of the user device and from the weapon and/or set of gloves to determine movement of the weapon. At step 1515, the set of motion detection data and the position of the user device and the weapon and/or set of gloves are combined to determine an x, y, z position of the user device and the weapon and a roll, pitch, and yaw or detection of the user device and the weapon. The current x, y, z orientation vectors for the user device and the weapon are calculated from the difference between the baseline position and orientation and the current position and orientation of the user device and the weapon. The set of motion detection data received is the roll, pitch, and yaw orientation movement of the head of the user and the weapon. At step 1516, the current positions and orientation vectors of the user device and the weapon are mapped to the simulation environment. In a preferred embodiment, the current positions and orientation vectors are a 1:1 ratio to the positions and orientation vectors in the simulation environment. For example, for every inch and/or degree that the user device and/or the weapon moves and/or rotates, the view of the user and/or the simulated weapon moves one inch and/or rotates one degree in the simulated environment. Other ratios may be employed. The mapping determines the display view, as will be further described below. At step 1517, the simulation environment that would be visible to the user based on the orientation of the user device and the weapon is displayed. Method 1500 ends at step 1518.

Figure 15C:
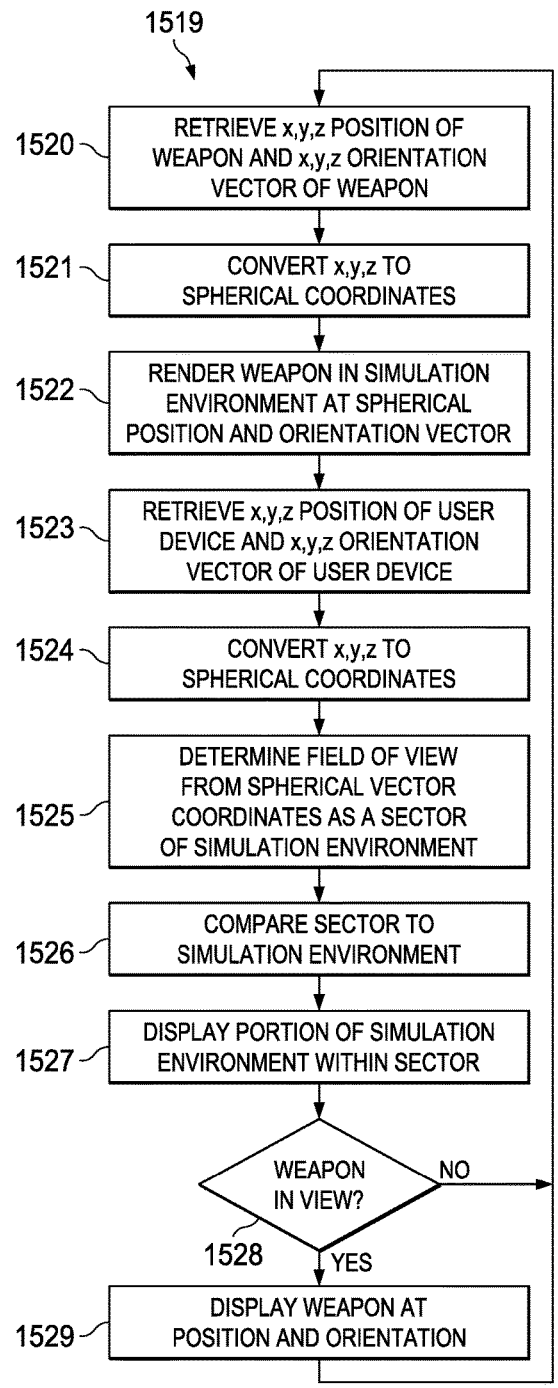
FIG. 15C is a flow chart of a method for mapping the position and orientation of the user device and the weapon to the simulation environment for determining a display field of view a preferred embodiment.

Referring to FIG. 15C, step 1516 will be further described as method 1519 for mapping the position and orientation of the user device and the weapon to the simulation environment for determining a display field of view. At step 1520, the x, y, z positions of the weapon and the weapon orientation vector are retrieved. At step 1521, the x, y, z positions of the weapon and the weapon orientation vector are converted to spherical coordinates (r, θ, φ) using:

$$r = \sqrt{x^2 + y^2 + z^2} \quad \text{Eq. 9}$$

$$\theta = \arccos\left(\frac{z}{\sqrt{x^2 + y^2 + z^2}}\right) \quad \text{Eq. 10}$$

$$\varphi = \arctan\left(\frac{y}{x}\right) \quad \text{Eq. 11}$$

At step 1522, the weapon is rendered in the simulation environment at the spherical position and orientation vector. At step 1523, the x, y, z positions of the user device and the user device orientation vector are retrieved. At step 1524, the x, y, z positions of the user device and the user device orientation vector are converted to spherical coordinates (r, θ, φ) using Eqs. 9, 10, and 11. At step 1525, the display field of view is determined from the spherical orientation vector coordinates. In this step, equal angles β are measured from the user device orientation vector to define the display field of view as a sector of the simulation environment in spherical coordinates. At step 1526, the field of view sector is compared to the simulation environment to determine a portion of the simulation environment within the field of view sector. At step 1527, the portion of the simulation environment within the field of view sector is displayed on the user device as the display field of view. At step 1528, the spherical position and orientation vector of the weapon is compared to the field of view sector to determine whether the weapon is in the display field of view. If the weapon is not in the display field of view, then method 1519 returns to step 1520. If the weapon is in the display field of view, then the weapon is displayed on the user device at the spherical position and orientation. Method 1519 then returns to step 1520.

Figure 16A:
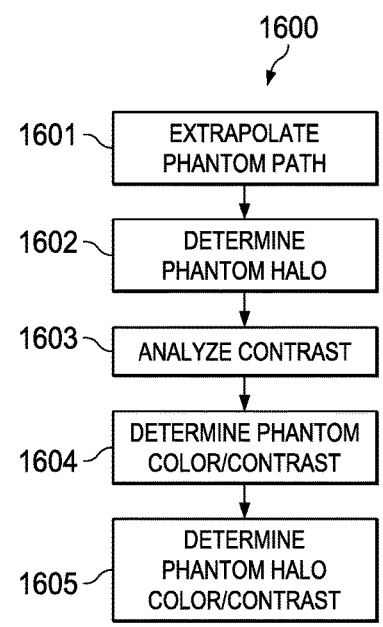
FIG. 16A is a flowchart of a method for determining a phantom and halo of a preferred embodiment.
Figure 16B:
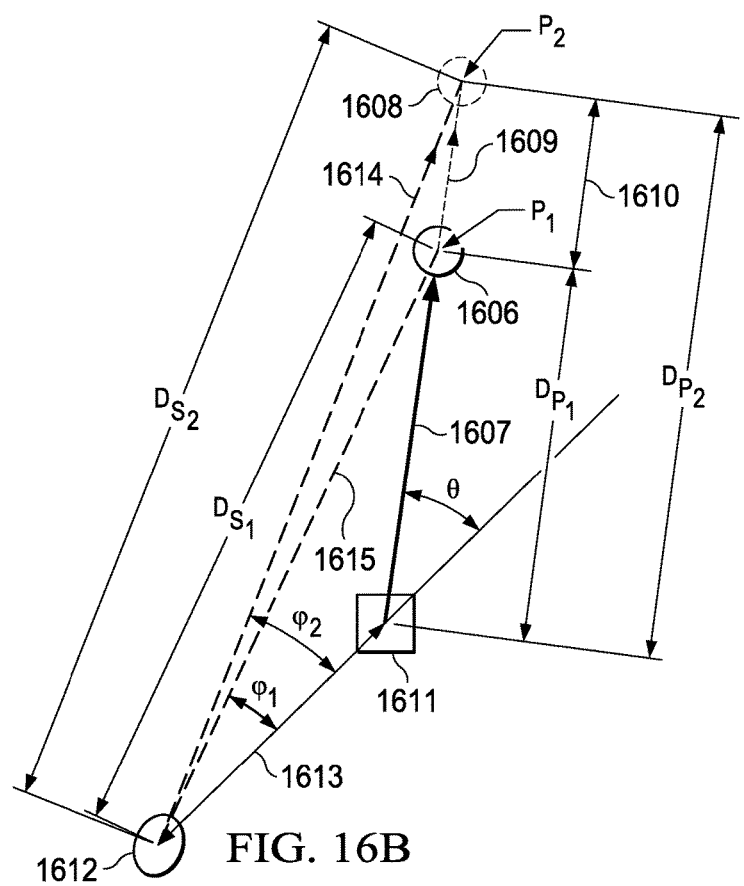
FIG. 16B is a plan view of a target and a phantom of a preferred embodiment.
Figure 16C:
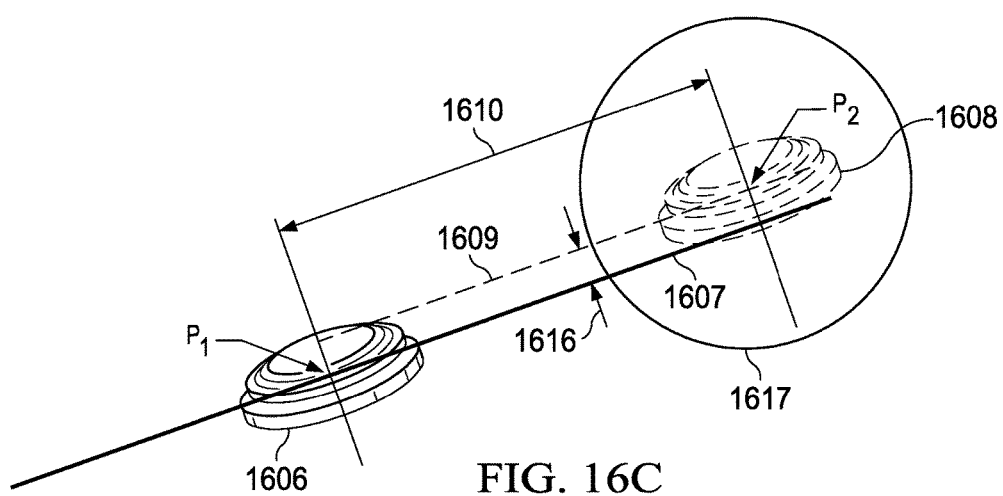
FIG. 16C is an isometric view of a target and a phantom of a preferred embodiment.

Referring to FIG. 16A, step 1407 will be further described as method 1600 for generating a phantom target and a phantom halo. At step 1601, a phantom path is extrapolated. Referring to FIGS. 16B and 16C, target 1606 is launched from launch point 1611 and moves along target path 1607 at position $P_1$. Phantom target 1608 moves along phantom path 1609 ahead of target 1606 at position $P_2$. Position $P_2$ is lead distance 1610 and drop distance 1616 from position $P_1$. Phantom path 1609 varies as target 1606 and target path 1607 varies, thereby varying lead distance 1610. Marksman 1612 is positioned at distance 1613 from launch point 1611. Marksman 1612 aims at phantom target 1608 and shoots along shot path 1614 to intercept target 1606. Target path 1607 is extrapolated over time using the set of target flight data. Target path 1607 is calculated using Eqs. 1-4.

Referring to FIG. 16B, lead distance 1610 is calculated using target path 1607, the relative marksman location, and the set of weapon data.

$$D_{P_2} \approx \frac{D_{S_2}\tan\varphi_2}{\cos\theta\tan\varphi_2 - \sin\theta} \quad \text{Eq. 12}$$

$$D_{P_1} \approx \frac{D_{S_1}\tan\varphi_1}{\cos\theta\tan\varphi_1 - \sin\theta} \quad \text{Eq. 13}$$

where $D_{P_2}$ is the distance of phantom target 1608 at position $P_2$ from launch point 1611, $D_{S_2}$ is the distance from marksman 1612 to phantom target 1608 along shot path 1614, $\varphi_2$ is the angle between shot path 1614 and distance 1613, θ is the launch angle between target path 1607 and distance 1613, $D_{P_1}$ is the distance of target 1606 at position $P_1$ from launch point 1611, $D_{S_1}$ is the distance from marksman 1612 to target 1606 along shot path 1615, $\varphi_1$ is the angle between shot path 1615 and distance 1613, θ is the launch angle between target path 1607 and distance 1613. Lead distance 1610 is:

$$D_{Lead} \approx D_{P_2} - D_{P_1} \quad \text{Eq. 14}$$

$$D_{Lead} \approx \frac{A\Delta D_S \tan C\Delta\varphi}{\cos B\theta \tan C\Delta\varphi - \sin B\theta} \quad \text{Eq. 15}$$

where $D_{Lead}$ is lead distance 1610, $\Delta D_S$ is the difference between the distances of shot paths 1614 and 1615, $\Delta\varphi$ is the difference between angles $\varphi_2$ and $\varphi_1$, θ is the launch angle between target path 1607 and distance 1613, A is a variable multiplier for shot size, gauge, and shot mass, B is a variable multiplier for θ including vibration of a target thrower and a misaligned target in the target thrower, and C is a variable multiplier for drag, lift, and wind.

For example, the approximate times it takes for a 7½ shot size shell with an initial muzzle velocity of approximately 1,225 feet per second to travel various distances is shown in Table 1.

TABLE 1

Time and Distances of a 7½ Shot

| Distance from barrel | Time (seconds) |
|---|---|
| 30 feet | 0.027 |
| 60 feet | 0.060 |

TABLE 1-continued

Time and Distances of a 7½ Shot

| Distance from barrel | Time (seconds) |
|---|---|
| 90 feet | 0.097 |
| 120 feet | 0.139 |
| 150 feet | 0.186 |
| 180 feet | 0.238 |

Various lead distances between target 1606 and phantom target 1608 for target 1606 having an initial velocity of approximately 30 mph is shown in Table 2.

TABLE 2

Lead Distances with a 7½ Shot on a Full Crossing Shot

| Distance from Barrel | Lead Distance |
|---|---|
| 60 feet | 2.64 feet |
| 90 feet | 4.62 feet |
| 120 feet | 5.56 feet |

Referring to FIG. 16C, phantom path 1609 is offset from target path 1607 by drop distance 1616 to simulate and compensate for the average exterior ballistics drop of a shot.

The "drop of a shot" is the effect of gravity on the shot during the distance traveled by the shot. The shot trajectory has a near parabolic shape. Due to the near parabolic shape of the shot trajectory, the line of sight or horizontal sighting plane will cross the shot trajectory at two points called the near zero and far zero in the case where the shot has a trajectory with an initial angle inclined upward with respect to the sighting device horizontal plane, thereby causing a portion of the shot trajectory to appear to "rise" above the horizontal sighting plane. The distance at which the weapon is zeroed, and the vertical distance between the sighting device axis and barrel bore axis, determine the amount of the "rise" in both the X and Y axes, i.e., how far above the horizontal sighting plane the rise goes, and over what distance it lasts.

Drop distance 1616 is calculated by:

$$D_{Drop} \approx v_t \tau \ln\left[\cosh\left(\frac{t_{impact}}{\tau}\right)\right] \quad \text{Eq. 16}$$

where $D_{Drop}$ is drop distance 1616, $t_{impact}$ is the time required for a shot string fired by marksman 1612 to impact target 1608. $T_{impact}$ is determined by a set of lookup tables having various impact times at predetermined distances for various shot strings.

$$v_t = \sqrt{\frac{2mg}{c\rho A}}, \text{ and} \quad \text{Eq. 17}$$

$$\tau = \frac{v_t}{g} \quad \text{Eq. 18}$$

where $v_t$ is the terminal velocity of target 1606, m is the mass of target 1606, g is the vertical acceleration due to gravity, C is the drag coefficient for target 1606, $\rho$ is the density of the air, A is the planform area of target 1606, and $\tau$ is the characteristic time.

Referring to FIGS. 16A and 16C, at step 1602, phantom halo 1617 is determined. Phantom halo 1617 is a simulation of a shot string at a distance of the phantom target from the position of the marksman. In a preferred embodiment, an area of phantom halo 1617 is determined from the set of weapon data and calculated by:

$$A_{shot\ string} = \pi R_{string}^2 \quad \text{Eq. 19}$$

$$R_{string} = \gamma R_{initial} + v_{spread} t \quad \text{Eq. 20}$$

$$A_{phantom\ halo} = A_{shot\ string} \quad \text{Eq. 21}$$

where $A_{shot\ string}$ is the area of the shot string, $R_{string}$ is the radius of the shot string, $R_{initial}$ is the radius of the shot as it leaves the weapon, $\gamma$ is a variable multiplier for any choke applied to the weapon as determined from the set of weapon data, $v_{spread}$ is the rate at which the shot spreads, and t is the time it takes for the shot to travel from the weapon to the target. $A_{phantom\ halo}$ is the area of phantom halo 1617.

In one embodiment, the area of phantom halo 1617 varies as the amount of choke applied to the weapon varies.

Returning to FIG. 16A, at step 1603, a relative contrast value between the target and a background surrounding the target is analyzed by calculating the difference between a grayscale brightness of the target and an average brightness of the background surrounding the target and the difference between an average color of the target and a color of the background surrounding the target based on a desired day/night setting and a set of desired environmental conditions.

At step 1604, a color and a contrast level of a phantom target is determined. In a preferred embodiment, the phantom target includes a set of pixels set at a predetermined contrast level. The predetermined contrast level is determined by the difference of the color between the phantom target and the target and the difference of the brightness between the phantom target and the target. In this embodiment, the predetermined contrast level is a range from a fully opaque image to a fully transparent image with respect to the image of the target and the image of the background.

In a preferred embodiment, the set of pixels is set at a predetermined color. For example, blaze orange has a pixel equivalent setting of R 232, G 110, B0.

At step 1605, a color and contrast level of the phantom halo is determined. In a preferred embodiment, the phantom halo includes a set of pixels set at a predetermined contrast level. The predetermined contrast level is determined by the difference of the color between the phantom halo and the target and the difference of the brightness between the phantom halo and the target. In this embodiment, the predetermined contrast level is a range from a fully opaque image to a fully transparent image with respect to the image of the target and the image of the background.

In a preferred embodiment, the set of pixels is set at a predetermined color. For example, black has a pixel equivalent setting of R 0, G 0, B 0. Any color may be employed.

Figure 17:
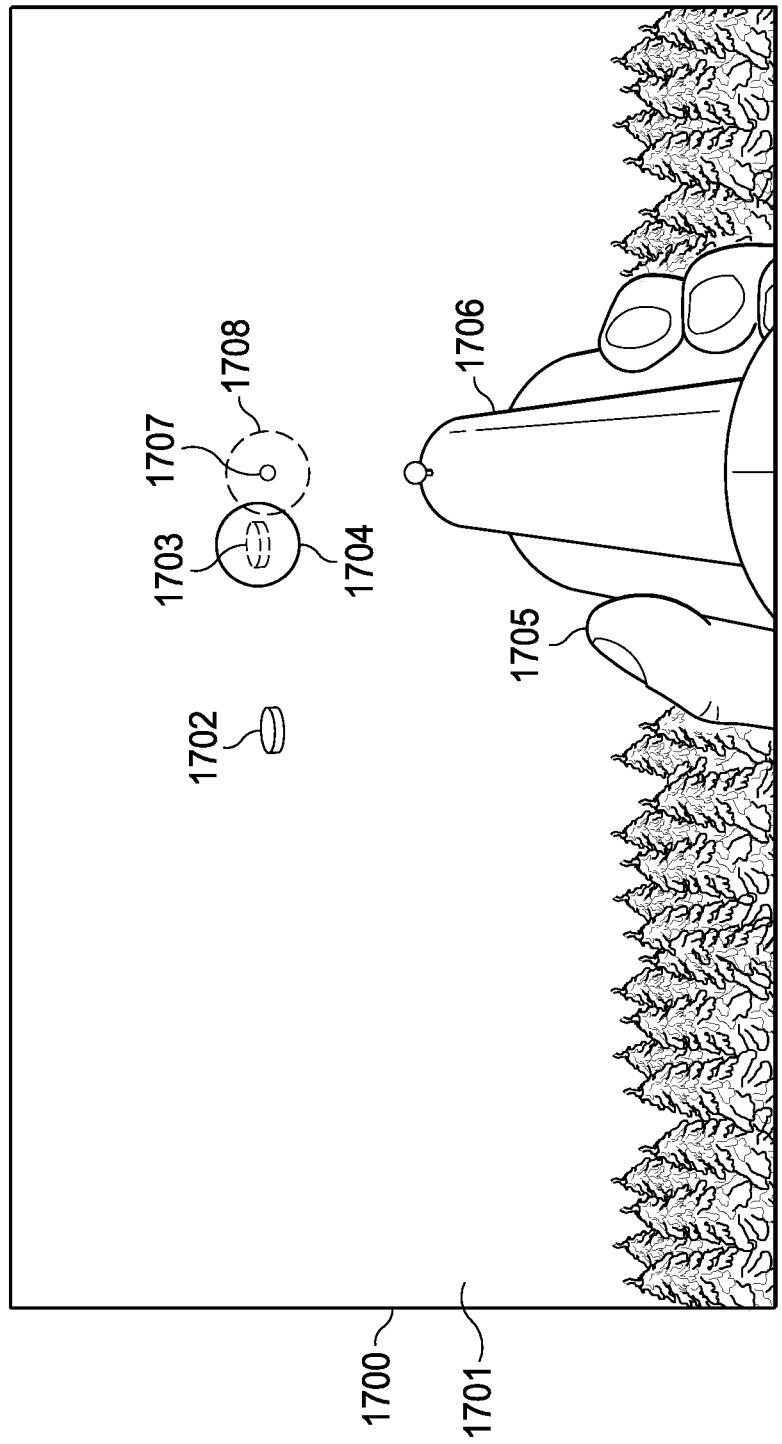
FIG. 17 is a user point of view of a virtual reality simulation system of a preferred embodiment.

Referring to FIG. 17, a view of a simulation from the perspective of a marksman wearing a user device, such as user device 900, is shown. Through display 1700, background environment 1701 and target 1702 are viewed. Phantom target 1703 is projected at a lead distance and at a drop distance from target 1702. Phantom halo 1704 is projected surrounding phantom target 1703. Marksman 1705 aims weapon 1706 at phantom target 1703.

In a preferred embodiment, shot center 1707 appears on display 1700 when marksman 1705 pulls a trigger of weapon 1706. Shot string 1708 surrounds shot center 1707.

In a preferred embodiment, shot string 1708 is a simulation of a shot pellet spread fired from weapon 1706.

In an alternative embodiment, shot center 1707 is not displayed and shot string 1708 is displayed traveling from the barrel of weapon 1706 along a trajectory. The trajectory, size, positioning, and flight path of shot string 1708 are based on the location and orientation of weapon 1706 and are based on the type of ammunition selected for the simulation. When shot string 1708 intersects target 1702, target 1702 is destroyed. An image of one or more of target 1702, phantom target 1703, and halo 1704 can be paused and displayed at their respective locations when the trigger of weapon 1706 was pulled while the target 1702 continues to move along its trajectory and shot string 1708 continues to move along its trajectory.

Figure 18:
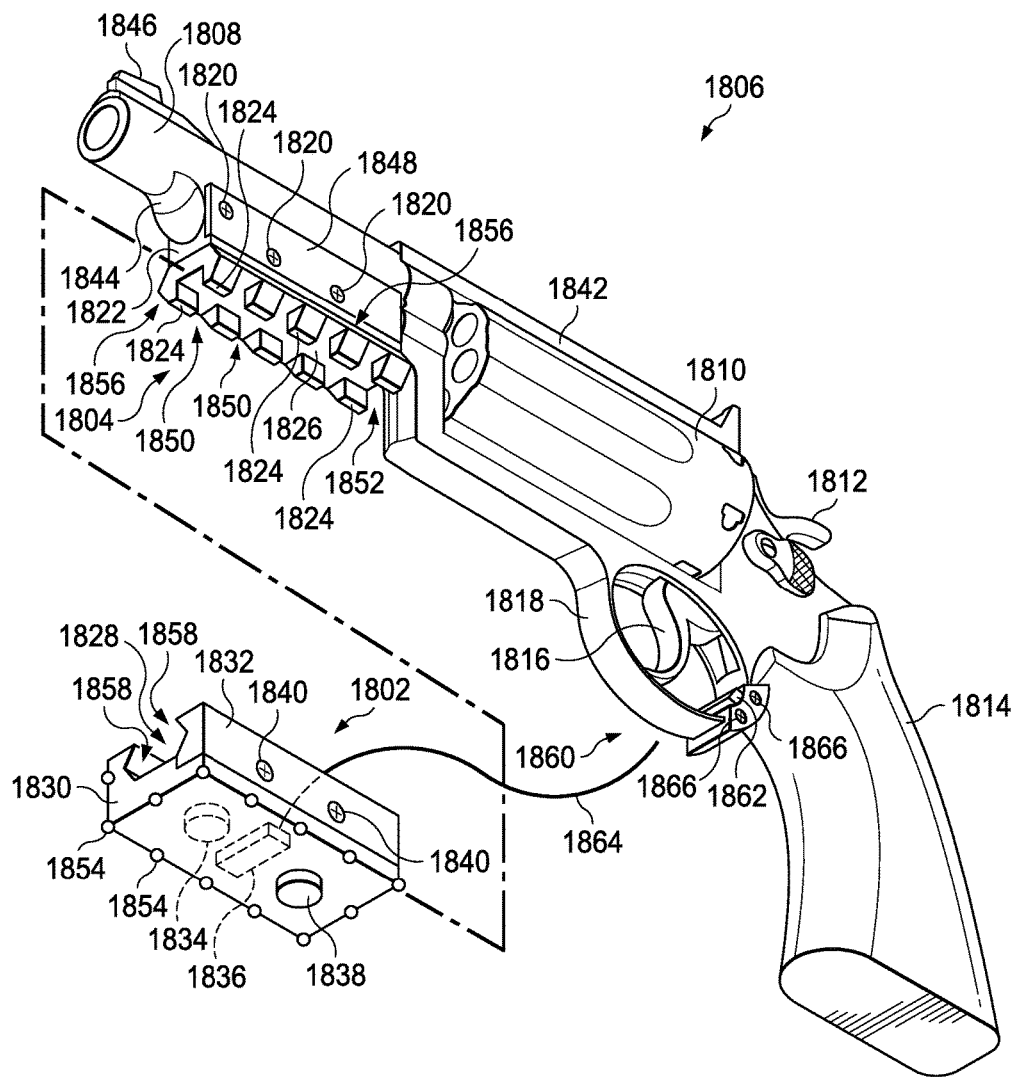
FIG. 18 is an isometric view of an input device configured to be mounted on a rail system of a weapon of a preferred embodiment.

Referring to FIG. 18, an isometric view shows an input device configured to be mounted on a rail system of a weapon. Input device 1802 is to be mounted to rail system 1804 of weapon 1806.

Weapon 1806 includes barrel 1808, sight 1846, frame 1842, member 1844, cylinder 1810, hammer 1812, handle 1814, trigger 1816, trigger guard 1818, trigger sensor 1860, and rail interface system 1804. Weapon 1806 is a double-action revolver wherein operation of trigger 1816 cocks and releases hammer 1812. Rotation of cylinder 1810 is linked to movement of hammer 1812 and trigger 1816.

Barrel 1808 is connected to frame 1842 and member 1844. Member 1844 supports barrel 1808 and is the portion of weapon 1806 to which rail interface system 1804 is mounted. In alternative embodiments, rail interface system 1804 is mounted to other parts or portions of weapon 1806, such as being directly mounted to barrel 1808.

Frame 1842 connects barrel 1808, member 1844, trigger guard 1818, trigger, handle 1814, hammer 1812, and cylinder 1810. Frame 1842 and handle 1814 house the mechanisms that create action between trigger 1816, cylinder 1810, and hammer 1812.

Rail interface system 1804 is a rail system for interfacing additional accessories to weapon 1806, such as tactical lights, laser aiming modules, forward hand grips, telescopic sights, reflex sights, red-dot sights, iron sights, holographic sights, bipods, bayonets, and so on. Rail interface system 1804 may conform to one or more standard rail systems, such as the Weaver rail mount, the Picatinny rail (also known as MIL-STD-1913), and the NATO Accessory Rail. Rail interface system 1804 includes screws 1820, base 1822, member 1848, and rail 1826.

Screws 1820 fit and secure rail interface system 1804 to member 1844 of weapon 1806. Screws 1820 compress base 1822 and member 1848 of rail interface system 1804 against member 1844 of weapon 1806.

Rail 1826 includes ridges 1824, slots 1850, and angled surfaces 1856. The longitudinal axis of rail 1826 is substantially parallel to the longitudinal axis of barrel 1808. Slots 1850 are the lateral voids or slots between ridges 1824 that are perpendicular to both the longitudinal axis of rail 1826 and the longitudinal axis of barrel 1808. Rail 1826 also includes a longitudinal slot 1852 that runs along the length of rail 1826 and is substantially parallel to the longitudinal axis of barrel 1808. Angled surfaces 1856 of rail 1826 allow for the precise mounting of accessories to rail 1826.

Input device 1802 includes rail mount 1828, first portion 1830, second portion 1832, battery 1834, processor 1836, LEDs 1854, button 1838, and screws 1840. Input device 1802 slides longitudinally onto rail 1826 of rail interface system 1804 of weapon 1806 and its position is secured by screws 1840. The front surface of input device 1802 is flush with a ridge 1824 of rail 1826 so that the location and orientation of input device 1802 with respect to barrel 1808 is known and the firing of weapon 1806 can be accurately simulated.

Rail mount 1828 of input device 1802 includes first portion 1830, second portion 1832, and angled surfaces 1858. Angled surfaces 1858 of rail mount 1828 correspond to angled surfaces 1856 of rail 1826 to allow for a tight and precise fitment of input device 1802 to rail interface system 1804. Screws 1840 of input device 1802 compress first portion 1830 and second portion 1832 against rail 1826 of rail interface system 1804 with sufficient force to prevent changes in the positioning or orientation of input device 1802 with respect to weapon 1806 as weapon 1806 is being used.

Battery 1834 of input device 1802 is connected to and powers the electrical components within input device 1802 including processor 1836 and LEDs 1854. Processor 1836 controls LEDs 1854. In additional embodiments, input device 1802 includes one or more sensors, accelerometers, gyroscopes, compasses, and communication interfaces. The sensor data from the sensors, accelerometers, gyroscopes, and compasses is sent from input device 1802 to a computer, such as computer 801 of FIG. 8, via the communication interface. Input device 1802 includes button 1838 to turn on, turn off, and initiate the pairing of input device 1802.

LEDs 1854 emit light that is sensed by one or more cameras or sensors, from which the locations and orientations of input device 1802 and weapon 1806 can be determined. The locations and orientations are determined from the transmission characteristics of the light emitted from LEDs 1854, and the placement characteristics of LEDs 1854.

Trigger sensor 1860 detects the pull of trigger 1816 when trigger 1816 presses onto pressure switch 1862 with sufficient movement and force. When hammer 1812 is fully cocked, trigger 1816 rests just above pressure switch 1862 so that any additional movement will release hammer 1812 and will activate pressure switch 1862. One or more wires 1864 electrically connect trigger sensor 1860 to processor 1836 so that processor 1860 can determine when trigger 1816 is pulled when blanks or live rounds are not used. Trigger sensor 1860 is contoured to fit onto the back end of trigger guard 1818 behind trigger 1816 and trigger sensor 1860 is secured onto trigger guard 1818 by screws 1866.

In a two wire embodiment, current from processor 1836 through a first wire of wires 1864 to trigger sensor 1860 is returned through a second wire of wires 1864. In an alternative embodiment, wire 1864 is a single wire and a return path for the current from processor 1836 through wire 1864 to trigger sensor 1860 is created by electrically connecting trigger sensor 1860 to trigger guard 1818, which is electrically connected to frame 1842, rail system 1804, input device 1802, and processor 1836.

In alternative embodiments, weapon 1806 is loaded with one or more live or blank rounds of ammunition that discharge through barrel 1808 after hammer 1812 is cocked and trigger 1816 is then pulled. Weapon 1806 does not include sensors for measuring the precise location of cylinder 1810, hammer 1812, and trigger 1816. During simulation and after a round has been fired, the simulation shows the movement of cylinder 1810, hammer 1812, and trigger 1816 to prepare for a subsequent shot, which may or may not correspond to the actual state of weapon 1806.

In alternative embodiments, the computer that receives data from one or more sensors from input device 1802 derives the state of weapon 1806 from data received from one or more sensors and updates the display of weapon 1806 to show the state and/or firing of weapon 1806 in the simulation. For example, data from sensors, accelerometers, and gyroscopes within input device 1802 can indicate the click for when hammer 1812 is fully cocked, indicate the click for when cocked hammer 1812 is released and the chamber in cylinder 1810 is unloaded, and indicate the discharge of a live or blank round of ammunition. Data from a microphone, such as microphone 919 of FIG. 9, can be used to similarly detect one or more states of weapon 1806 and the discharge of live or blank rounds of ammunition. When cylinder 1810 is configured to hold six rounds of ammunition and six shots have been fired successively, the simulation may indicate to the user that it is time to reload weapon 1806. The simulation displays changes to the state of weapon 1806 as mechanical movements on weapon 1806 and displays the firing of weapon 1806 with associated mechanical movements of weapon 1806.

Referring to FIG. 19, a simulation view shows "beams" being projected from a barrel of a weapon. Weapon 1902 includes barrel 1904 with one or more simulated beams 1906, 1912, 1916, 1920, 1924, 1928, 1932, and 1936 that emanate from the tip of barrel 1904. Beams 1906, 1912, 1916, 1920, 1924, 1928, 1932, and 1936 follow and are adjusted with the movement of barrel 1904 of weapon 1902.

The beam of a laser in a real world environment is generally not visible to an observer unless reflected from an object in the environment. In a virtual reality environment, however, a simulated laser beam can be calculated and displayed. Simulated beams can be displayed with any level of transparency and can demonstrate characteristics that are not possible in the real world. For example, the simulated beam can be displayed as visible, and with a dispersion pattern or in a curved path.

As an example, beam 1906 is a beam of a simulated laser and is displayed as visible along its entire length. The beam is displayed as a line or as a tight cylinder. Beam 1906 emanates from point 1908 that is central to and aligned with barrel 1904. Beam 1906 indicates the precise direction that barrel 1904 is pointed. Beam 1906 extends to point 1910 that is on the central longitudinal axis of barrel 1904 and is a fixed distance away from barrel 1904.

In another embodiment, beam 1912 is displayed as a conical frustum starting from barrel 1904 and extending to circular cross section 1914. The increase of the radius of beam 1912 from the radius of barrel 1904 to cross section 1914 approximates the increasing spread of a shot as it travels away from barrel 1904. Circular cross section 1914 is displayed at the termination plane of beam 1912 and provides an indication of the maximum distance that a shot on target can reliably register as a hit.

Beams 1906 and 1912 maintain their respective shapes and orientation with respect to barrel 1904 as it is moved. Pulling the trigger of weapon 1902 while beam 1906 or beam 1912 is aligned with a phantom target or phantom halo, such as phantom target 1703 or phantom halo 1704 of FIG. 17, registers as a hit to the simulated target.

Beam 1916 is displayed as a curved line that extends from point 1908 at barrel 1904. Beam 1916 is tangential to beam 1906 at point 1908 and ends at point 1918.

In another embodiment, beams 1916 and 1920 are curved to approximate the drop of a shot due to gravity. The curvature of beams 1916 and 1920 is calculated based on the amount of simulated force due to gravity 1940 and the angle of barrel 1904 when the trigger is pulled. Pulling the trigger of weapon 1902 while beam 1916 or beam 1920 is aligned with a phantom target or phantom halo, such as phantom target 1703 or phantom halo 1704, registers as a hit to the simulated target.

In another embodiment, beam 1920 is displayed as a curved conical frustum beginning at barrel 1904 and ending at circular cross section 1922. Beam 1920 is curved to approximate the drop of a shot due to gravity and has a radius that increases along the length from barrel 1904 to cross section 1922 to simulate the spread of a shot.

In another embodiment, beams 1924 and 1928 are curved to approximate changes in shot trajectory due to windage 1942. The amount of curvature of beams 1924 and 1928 is based on the amount of simulated force due to windage 1942 and the angle of barrel 1904 with respect to windage 1942. The simulation of windage may approximate changes in wind velocity and direction, such as found in a gusty wind. In this embodiment, the simulation is calculated so that the beam moves with respect to the longitudinal axis of the barrel to indicate how the shot would be affected by windy conditions. When windage 1942, is simulated, pulling the trigger of weapon 1902 while beam 1924 or beam 1928 is aligned with a phantom target or phantom halo, such as phantom target 1703 or phantom halo 1704, registers as a hit to the simulated target.

Beam 1924 is displayed as a curved line that extends from point 1908 at the tip of barrel 1904. Beam 1924 is tangential to beam 1906 at point 1908 and ends at point 1926.

Beam 1928 is displayed as a curved conical frustum starting at the circular tip of barrel 1904 and ending at circular cross section 1930. Beam 1928 is curved to approximate the drop of a shot due to gravity and has a radius that increases along the length from the tip of barrel 1904 to cross section 1930 to simulate the spread of a shot.

Beams 1932 and 1936 are curved to approximate changes in shot trajectory due to both gravity 1940 and windage 1942. The curvature of beams 1932 and 1936 is based on the amount of gravity 1940 and windage 1942 and based on the angle of barrel 1904 with respect to gravity 1940 and windage 1942. When both gravity 1940 and windage 1942 are simulated, pulling the trigger of weapon 1902 while beam 1932 or beam 1936 is aligned with a phantom target or phantom halo, such as phantom target 1703 or phantom halo 1704, registers as a hit to the simulated target.

Beam 1932 is displayed as a curved line that extends from point 1908 at the tip of barrel 1904. Beam 1932 is tangential to beam 1906 at point 1908 and ends at point 1934.

Beam 1936 is formed as a curved conical frustum starting at 'barrel 1904 and ending at circular cross section 1938. Beam 1936 is curved to approximate the changes to the trajectory of a shot due to both gravity 1940 and windage 1942 and the radius of beam 1936 increases along the length from the tip of barrel 1904 to cross section 1938 to approximate the spread of a shot.

It will be appreciated by those skilled in the art that the described embodiments disclose significantly more than an abstract idea including technical advancements in the field of data processing and a transformation of data which is directly related to real world objects and situations in that the disclosed embodiments enable a computer to operate more efficiently. For example, the disclosed embodiments transform positions, orientations, and movements of a user device and a weapon into a graphical representations of the user and the weapon in a simulation environment.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A system comprising a weapon, a removable plug, a virtual reality unit, and a computer, the system for generating and displaying a virtual reality simulation, the system further comprising:
   the weapon comprising:
      a first sight;
   the removable plug fitted to the weapon, the removable plug comprising:
      a sensor system, from which first sensor data is generated that is related to a location and orientation of the weapon;
   the virtual reality unit comprising:
      a processor programmed to:
         operate a set of sensors of the virtual reality unit;
         generate and display a second sight that is different from the first sight;
   the computer programmed to:
      generate, based on the location and orientation of the weapon derived from the first sensor data and based on the location and orientation of the virtual reality unit derived from second sensor data, the virtual reality simulation including the virtual target, a phantom target, a halo on the phantom target, the weapon, and a sight profile; and,
      generate the phantom target with a lead and a drop so that a simulated shot from the weapon aimed at the phantom target would hit the virtual target, the lead and the drop based on a direction and a speed of the virtual target.

2. The system of claim 1:
   wherein the second sight is one of an iron sight, a reflex sight, and a holographic sight.

3. The system of claim 2:
   wherein the weapon comprises:
      a muzzle;
      an adjustable comb; and,
      an adjustable butt plate.

4. The system of claim 3:
   wherein the removable plug is fitted to the weapon and further comprises:
      a battery to power components of the removable plug, including the sensor system and a processor;
      a communication interface;
      a connector to connect the removable plug to the muzzle of the weapon; and,
      the processor of the removable plug programmed to operate the one or more sensors of the removable plug.

5. The system of claim 4 further comprising:
   a first portion of the removable plug that fits inside the muzzle.

6. The system of claim 5 further comprising:
   a second portion of the removable plug that fits outside the muzzle and including the sensor system of the removable plug.

7. The system of claim 6:
   wherein the virtual reality unit further comprises:
      the set of sensors, from which the second sensor data is generated that is related to a location and orientation of the virtual reality unit;
      a display unit to display a virtual target, a phantom target, a halo on the phantom target, a virtual weapon that represents the weapon in the virtual reality simulation, a sight profile, a suggested adjustment for the adjustable comb, and a suggested adjustment for the adjustable butt plate; and,
      a communication interface.

8. The system of claim 7:
   wherein the computer is further programmed to:
      generate the phantom target with the lead and the drop based on a type of ammunition being simulated;
      generate tracking data that includes the number of targets that are hit, the number of targets that are missed, a location of each shot with respect to the phantom target, and a location of a shot string with respect to a trajectory of the virtual target; and,
      generate the suggested adjustment for the adjustable comb and the suggested adjustment for the adjustable butt plate based on the tracking data.

9. The system of claim 8:
   wherein the weapon includes a trigger sensor attached to a trigger guard of the weapon and that includes:
      a pull ring;
      a set of screws to secure the trigger sensor to the trigger guard;
      a light emitting diode (LED); and,
      a controller configured to control the LED to generate a coded signal that corresponds to a state of the trigger sensor.

10. The system of claim 9 wherein the computer is further programmed to:
    display, based on detection of a discharge of a round of ammunition from the weapon, a cycling of a receiver of the weapon in the virtual reality simulation.

11. A system for generating and displaying a virtual reality simulation that comprises:
    a weapon that includes a first sight;
    a removable plug configured for attachment directly to a preferred barrel of the weapon;
    a virtual reality unit;
    a computer;
    the removable plug fitted to the weapon, the removable plug comprising:
       a sensor system, from which first sensor data is generated that is related to a location and orientation of the weapon;
    the virtual reality unit comprising:
       a processor programmed to:
          operate a set of sensors of the virtual reality unit from which second sensor data is generated that is related to a location and orientation of the virtual reality unit;
          generate and display a second sight that is different from the first sight;
    the computer programmed to:
       generate, based on the first sensor data and the second sensor data, the virtual reality simulation including a virtual target, a phantom target, a halo on the phantom target, the weapon, and a sight profile; and,
       generate the phantom target with a lead and a drop so that a simulated shot from the weapon aimed at the phantom target would hit the virtual target, the lead and the drop based on a direction and a speed of the virtual target.

12. The system of claim 11:
    wherein the weapon is an over-under shotgun having an upper barrel and a lower barrel; and,
    wherein the preferred barrel is the lower barrel.

13. The system of claim 12:
wherein the removable plug further comprises:
a hollow portion to allow discharge of live rounds of ammunition during the virtual reality simulation.

14. The system of claim 13:
wherein the removable plug further comprises:
a front surface of the removable collar that is flush with a front surface of the under barrel.

15. The system of claim 14:
wherein the removable plug further comprises:
a member that is flat and elongated to that allow for removable collar to be fitted to an end of the lower barrel.

16. A system for generating and displaying a virtual reality simulation that comprises:
a weapon that includes a first sight;
a removable plug;
a virtual reality unit;
a computer;
the removable plug fitted to the weapon, the removable plug comprising:
a sensor system, from which first sensor data is generated that is related to a location and orientation of the weapon;
the virtual reality unit comprising:
a processor programmed to:
operate a set of sensors of the virtual reality unit from which second sensor data is generated that is related to a location of the virtual reality unit;
generate and display a second sight that is different from the first sight;
project a beam from a barrel of the weapon;
the computer programmed to:
generate, based on first sensor data and the second sensor data, the virtual reality simulation including a virtual target, a phantom target, a halo on the phantom target, the weapon, and a sight profile; and,
generate the phantom target with a lead and a drop so that a simulated shot from the weapon aimed at the phantom target would hit the virtual target, the lead and the drop based on a direction and a speed of the virtual target.

17. The system of claim 16:
wherein the beam is displayed as visible along its entire length.

18. The system of claim 17:
wherein the beam is displayed as one of a line, a tight cylinder, and a conical frustum.

19. The system of claim 18:
wherein the beam includes a circular cross section at an end that indicates a maximum distance to reliably register a hit.

20. The system of claim 19:
wherein the beam is curved to approximate effects from gravity and windage.

* * * * *